US012651763B2

(12) United States Patent
Bayat

(10) Patent No.: US 12,651,763 B2
(45) Date of Patent: Jun. 9, 2026

(54) SYSTEMS AND METHODS FOR STACKING ELECTRODES

(71) Applicant: Rivian IP Holdings, LLC, Plymouth, MI (US)

(72) Inventor: Daniel Bayat, Reno, NV (US)

(73) Assignee: Rivian IP Holdings, LLC, Irvine, CA (US)

( * ) Notice: Subject to any disclaimer, the term of this patent is extended or adjusted under 35 U.S.C. 154(b) by 916 days.

(21) Appl. No.: 17/891,419

(22) Filed: Aug. 19, 2022

(65) Prior Publication Data

US 2024/0063421 A1      Feb. 22, 2024

(51) Int. Cl.
H01M 10/04      (2006.01)
B26D 7/06      (2006.01)
H01M 4/04      (2006.01)
H01M 10/0585      (2010.01)

(52) U.S. Cl.
CPC .......... H01M 10/0404 (2013.01); B26D 7/06 (2013.01); H01M 4/04 (2013.01); H01M

10/0468 (2013.01); H01M 10/0585 (2013.01); H01M 2220/20 (2013.01)

(58) Field of Classification Search
CPC ............... H01M 10/0404; H01M 4/04; H01M 10/0468; H01M 10/0585; H01M 2220/20; B26D 7/06
See application file for complete search history.

(56) References Cited

U.S. PATENT DOCUMENTS

| | | | | |
|---|---|---|---|---|
| 3,353,822 A | * | 11/1967 | Dangelmaier ......... | B21D 43/24 271/18.1 |
| 4,034,846 A | * | 7/1977 | Burgis ................... | B65G 57/00 414/788.9 |
| 9,466,825 B2 | * | 10/2016 | Miyazaki ............ | H01M 4/0471 |

* cited by examiner

*Primary Examiner* — Donghai D Nguyen

(74) *Attorney, Agent, or Firm* — Foley & Lardner LLP

(57) ABSTRACT

A system to stack electrode layers can include a magnetic well and a magnet. The magnetic well can define a cavity. The cavity can be configured to allow a movement of an electrode layer through the cavity. The magnet can generate a magnetic field within the magnetic well. The magnetic field interacts with the electrode layer to control the movement of the electrode layer through the cavity.

16 Claims, 13 Drawing Sheets

1200

Provide System  1205

1300

SYSTEMS AND METHODS FOR STACKING ELECTRODES

INTRODUCTION

Vehicles can use electricity to power a motor. Electricity can be provided by a battery to operate the vehicle or components thereof.

SUMMARY

A system for stacking electrode layers can include a magnetic well defining a cavity, at least one magnet, and a transfer pallet. The cavity of the magnetic well can receive an electrode layer. The electrode layer can move through the magnetic well (e.g., move from a top of the magnetic well to a bottom of the magnetic well via gravitational force). The magnet can generate a magnetic field within the cavity of the magnetic well. The magnetic field can induce a current in the electrode layer. The induced current can cause a second magnetic field to be generated that opposes the magnetic field. The second magnetic field can control the movement of the electrode layer (e.g., reduce a velocity of the electrode layer within the magnetic well). The transfer pallet can be positioned proximate the bottom of the magnetic well. The transfer pallet can receive the electrode layer after the electrode layer exits the cavity of the magnetic well. By controlling the movement of the electrode layer in a contactless or nearly-contactless manner, the system for stacking electrode layers can accurately provide the electrode layer to the transfer pallet for subsequent operations while reducing the risk of damage to the electrode layer. Multiple electrode layers can be provided to the magnetic well. The movement of each electrode layer can be controlled by the magnet. Multiple electrode layers can be stacked (e.g., one electrode layer positioned on top of another) within transfer pallet).

At least one aspect is directed to a system for stacking electrode layers. The system can include a magnetic structure, for example magnetic well and a magnet. The magnetic structure (e.g., magnetic well) can define a cavity or passage. The cavity can be configured to allow a movement of an electrode layer through the cavity. The magnet can generate a magnetic field within the magnetic well. The magnetic field interacts with the electrode layer to control the movement of the electrode layer through the cavity.

At least one aspect is directed to a method. The method can include providing a first electrode layer to a cavity defined by a magnetic well. The first electrode layer can move through the cavity in a stacking direction. The magnetic well can generate a magnetic force to control a movement of the first electrode layer. The method can include providing a second electrode layer to the cavity. The second electrode layer can move through the cavity in the stacking direction. The magnetic well can generate the magnetic force to control a movement of the second electrode layer. The method can include receiving the first electrode layer in a transfer pallet. The method can include receiving the second electrode layer in the transfer pallet, the second electrode layer stacked on the first electrode layer.

At least one aspect is directed to an electric vehicle. The electric vehicle can include a battery cell. The battery cell can include a plurality of electrode layers stacked to form an electrode layer stack. The electrode layer stack can be produced by providing a first electrode layer to a cavity defined by a magnetic well. The first electrode layer can move through the cavity in a stacking direction. The magnetic well can generate a magnetic force to control a movement of the first electrode layer. The electrode layer stack can be produced by providing a second electrode layer to the cavity. The second electrode layer can move through the cavity in the stacking direction. The magnetic well can generate the magnetic force to control a movement of the second electrode layer. The electrode layer stack can be produced by receiving the first electrode layer in a transfer pallet. The electrode layer stack can be produced by receiving the second electrode layer in the transfer pallet. The second electrode layer can be stacked on the first electrode layer.

At least one aspect is directed to a method. The method can include providing a system to stack electrode layers. The system can include a magnetic well and a magnet. The magnetic well can define a cavity. The cavity can be configured to allow a movement of an electrode layer through the cavity. The magnet can generate a magnetic field within the magnetic well. The magnetic field interacts with the electrode layer to control the movement of the electrode layer through the cavity.

At least one aspect is directed to a method. The method can include providing a battery cell. The battery cell can include an electrode layer stack. The electrode layer stack can be produced by providing a first electrode layer to a cavity defined by a magnetic well. The first electrode layer can move through the cavity in a stacking direction. The magnetic well can generate a magnetic force to control a movement of the first electrode layer. The electrode layer stack can be produced by providing a second electrode layer to the cavity. The second electrode layer can move through the cavity in the stacking direction. The magnetic well can generate the magnetic force to control a movement of the second electrode layer. The electrode layer stack can be produced by receiving the first electrode layer in a transfer pallet. The electrode layer stack can be produced by receiving the second electrode layer in the transfer pallet, the second electrode layer stacked on the first electrode layer.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
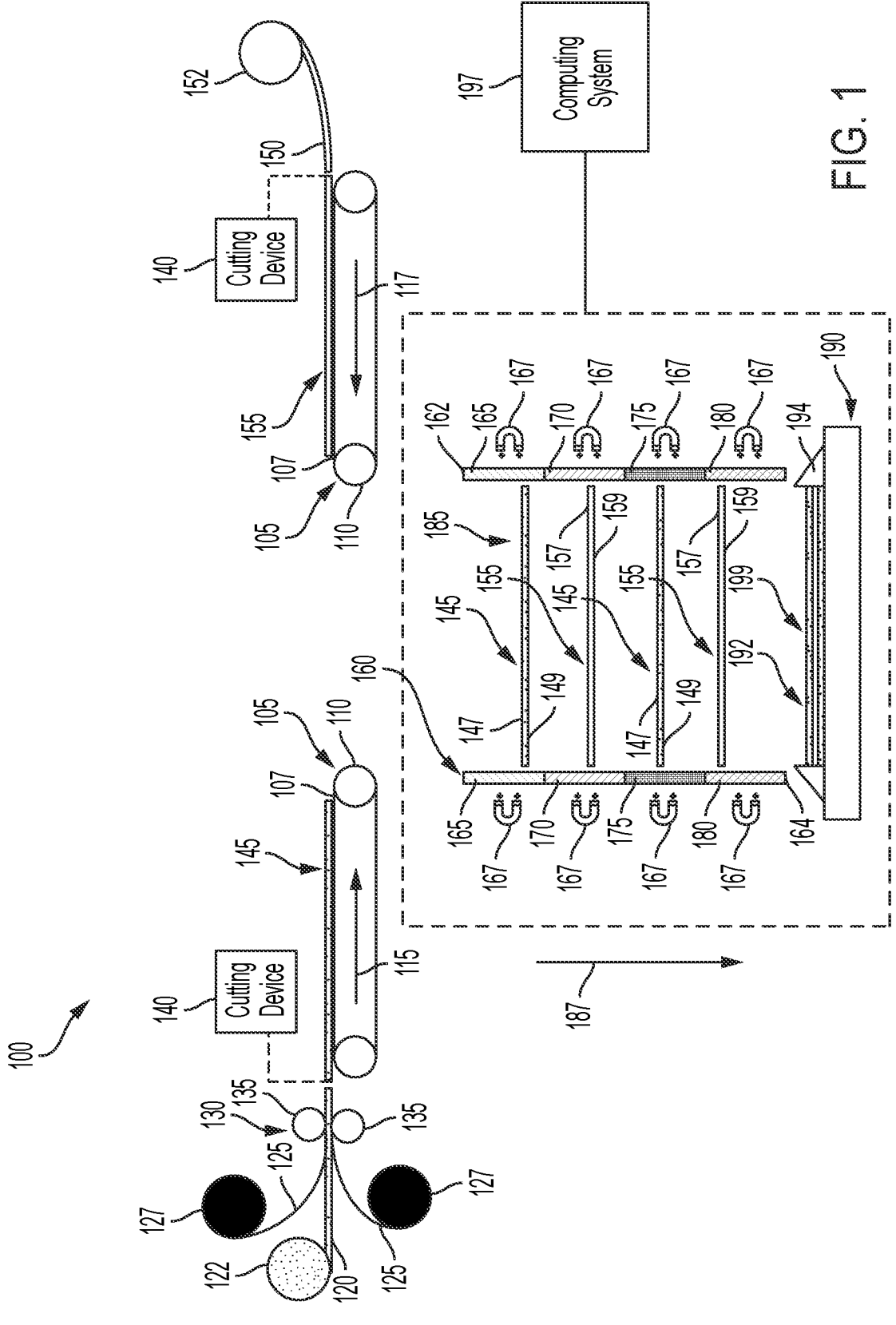
FIG. 1 depicts an example system for stacking electrode layers, in accordance with some aspects.

Following below are more detailed descriptions of various concepts related to, and implementations of, methods, apparatuses, and systems for stacking electrode layers. The various concepts introduced above and discussed in greater detail below may be implemented in any of numerous ways.

The present disclosure is directed to systems and methods manufacturing a battery cell. For example, the present disclosure is directed to systems and methods of stacking electrode layers (e.g., a jelly roll insert) for a battery cell using a magnetic well to control the movement of an electrode layer. The systems and methods can produce a stack of singulated electrode layers that have been aligned (e.g., edge-to-edge, center-to-center, or some other alignment) and stacked in a particular order (e.g., cathode, anode, cathode, anode, etc.). The systems and methods can produce a stack of electrode layers for a solid-state battery. The systems and methods can reduce or substantially eliminate operations requiring physical contact with singulated electrode layers to minimize risk of damage to electrode layers during the stacking operation. By providing a contactless or nearly contactless means of stacking electrode layers, the systems and methods can eliminate the need for a disposable layer (e.g., a peel layer) to be placed on one or more surfaces of each electrode layer, and this eliminate an operation to remove the disposable layer.

Systems and methods of the present technical solution can include a magnetic well that can receive a singulated electrode layer. For example, the magnetic well (e.g., a magnetic structure) can be or include a hollow tube defining a cavity having a cross-sectional shape that is similar to a cross-sectional shape of an electrode layer. The magnetic well can extend for a length in a stacking direction. The electrode layer can be provided to (e.g., fed into, deposited into, inserted in) the cavity of the magnetic well with a surface of the electrode layer perpendicular to the stacking direction. Each of one or more walls of the magnetic well can be proximate to an edge of the electrode layer with the electrode layer within the magnetic well. The electrode layer can fall (e.g., move in the stacking direction via a gravitational force) through (e.g., in, within, between a first portion and a second portion of, into, inside) the cavity of the magnetic well. For example, the electrode layer can pass from one end of the magnetic structure toward another end of the magnetic well or magnetic structure. The electrode layer can move between a first end and a second end of the magnetic well or the magnetic structure. The magnetic well can include at least one magnet that can generate a magnetic field. For example, the magnet can be an electromagnet configured to generate an electromagnetic field. As the electrode layer falls through the cavity, the magnet can generate a magnetic field that interacts with the moving electrode layer. More specifically, as the electrode layer moves through the cavity in the stacking direction, current can be induced in the electrode layer which can create a second magnetic field that opposes the magnetic force according to Lenz's law. The opposing magnetic field can act to control (e.g., retard, slow, decrease, reduce, increase, accelerate) a velocity of the electrode layer as it moves through the magnetic well. The magnetic well can include multiple sections, where each section can include at least one magnet generating a magnetic field. The magnetic field in one section can be different from a magnetic field in another section. For example, the magnetic field can increase from a top of the magnetic well to a bottom. The velocity of the electrode layer as it moves through the cavity can vary as a strength of the magnetic field of the magnetic well varies. The electrode layers can be collected in a transfer pallet positioned beneath the magnetic well. The transfer pallet can include guides that define a cavity. Electrode layers can be stacked within the cavity of the transfer pallet and prepared for subsequent operations (e.g., insertion into a battery cell housing or container).

The systems and methods can include a first conveyor device to provide a cathode electrode layer to the magnetic well and a second conveyor device to provide an anode electrode layer to the magnetic well. For example, the system can include a first conveyor device that can receive a cathode electrode sheet that has been laminated with a separator layer via a laminating nip. The cathode electrode layer can be singulated (e.g., cut or separated) from the cathode electrode sheet by a cutting device after a lamination operation. The conveyor device can include a conveyor surface that moves in a first direction to provide the cathode electrode layer to the magnetic well. The system can include a second conveyor device that can receive an anode electrode sheet. The anode electrode layer can be singulated (e.g., cut or separated) from the anode electrode sheet by a cutting device as the conveyor device receives the anode electrode layer. The conveyor device can include a conveyor surface that moves in a second direction to provide the anode electrode layer to the magnetic well.

FIG. 1, among others, depicts a system 100 for stacking electrode layers. The system 100 can include a magnetic well 160 and at least one magnet 167. For example, the system 100 can include a first magnet 167, a second magnet 167, a third magnet 167, and a fourth magnet 167. The magnetic well 160 can be or include the magnet 167, the magnet 167, the magnet 167, or the magnet 167. The magnetic well 160 can define a cavity 185. The magnetic well 160 can be a hollow tube having a top 162 and a bottom 164. The cavity 185 can extend through the magnetic well 160 from the top 162 of the magnetic well 160 to the bottom 164. The cavity 185 can be accessible from the top 162 of the magnetic well 160 or from the bottom 164 of the magnetic well 160. For example, the magnetic well 160 and the cavity 185 can extend for a length in a stacking direction 187.

The cavity 185 can allow movement of an object through the cavity 185. For example, the cavity 185 can be larger than an electrode to allow a movement of at least one electrode layer through (e.g., in, within, between a first portion and a second portion of, into, inside) the cavity 185.

The cavity 185 can allow a movement of a first electrode layer 145, a second electrode layer 155, or some other electrode layer through the magnetic well 160. The cavity 185 can allow for a movement of the electrode layer (e.g., electrode layer 145 or electrode layer 155) from the top 162 of the magnetic well 160 to the bottom 164 of the magnetic well 160. The cavity 185 can allow the electrode layer to move from the top 162 of the magnetic well 160, through the cavity 185 within the magnetic well 160, and out of the bottom 164 of the magnetic well 160. For example, an electrode layer that is provided to one side (e.g., the top 162) the magnetic well 160 can move through the magnetic well 160 and be received at another side (e.g., the bottom 164).

Figure 3:
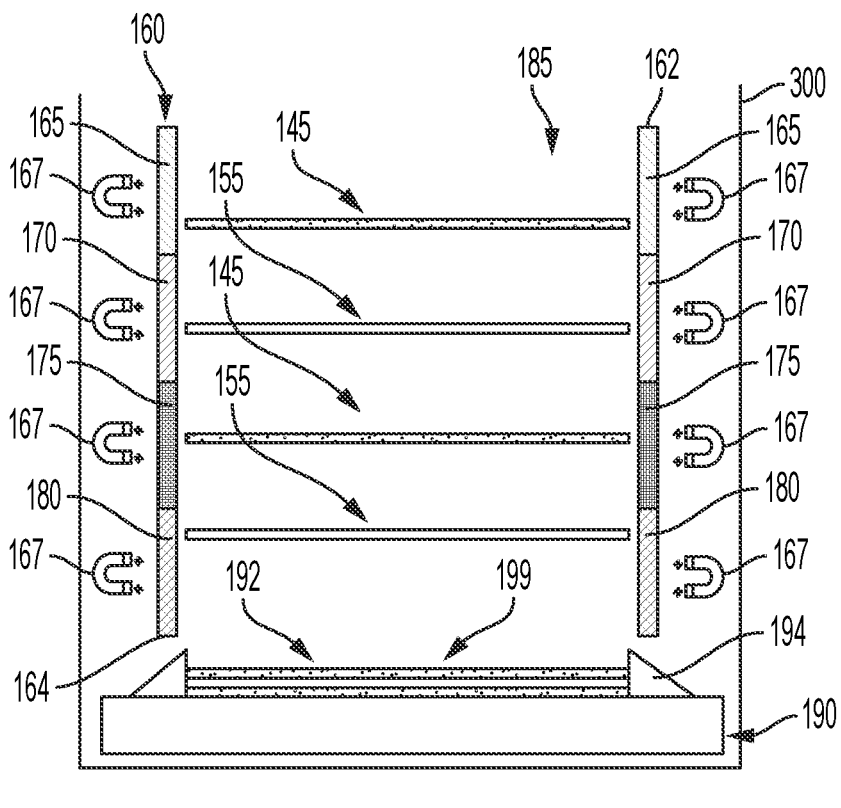
FIG. 3 depicts an example system for stacking electrode layers, in accordance with some aspects.

The system 100 can include the cavity 185 to allow movement of a plurality of electrode layers through the cavity 185. For example, multiple electrode layers can move through (e.g., in, within, between a first portion and a second portion of, into, inside) the cavity 185, including a first electrode layer 145 and a second electrode layer 155. The first electrode layer 145 and the second electrode layer 155 can move consecutively through the cavity 185. For example, the first electrode layer 145 can enter the cavity 185 at a first time, and the second electrode layer 155 can enter the cavity 185 at a second time, where the first time and the second time can be different. The first electrode layer 145 can move through the cavity 185 before the second electrode layer 155. Additional electrode layers, such as multiple first electrode layers 145 or multiple second electrode layers 155 can consecutively move through the cavity 185. The multiple electrode layers can move through the cavity 185 in alternating fashion such that a first electrode layer 145 is followed by a second electrode layer 155, which is further followed by a first electrode layer 145, which is further followed by a second electrode layer 155, as shown in FIGS. 1 and 3, among others.

The electrode layer can move through the magnetic well 160 via a gravitational force. For example, the electrode layer can move through (e.g., in, within, between a first portion and a second portion of, into, inside) the cavity 185 of the magnetic well 160 in a stacking direction 187. The stacking direction 187 can be vertical or substantially vertical (e.g., +15° from vertical). For example, the cavity 185 can extend in the stacking direction 187 through the magnetic well 160. An electrode layer (e.g., the electrode layer 145, the electrode layer 155, or some other electrode layer) can be provided to the cavity 185 of the magnetic well 160. The electrode layer can move (e.g., fall, descend, drop, sink) in the stacking direction 187 as it moves through the cavity 185, for example.

The electrode layer can be a first electrode layer 145, a second electrode layer 155, or some other electrode layer. The first electrode layer 145 can be a cathode electrode layer. For example, the first electrode layer 145 can include a cathode electrode material (e.g., a battery active material). The cathode electrode material can be laminated with at least one separator layer to form the first electrode layer 145. The first electrode layer 145 can include a first surface 147 and a second surface 149. The first electrode layer 145 can include a square or rectangular cross-sectional shape. For example, the first electrode layer 145 can include a thin, sheet-like profile. The first electrode layer 145 can include at least one edge (e.g., four edges). The first electrode layer 145 can include a generally rectangular shape and can include a protrusion (e.g., a projection) extending from an edge of the first electrode layer 145. For example, the first electrode layer 145 can include at least one electrode tab extending from an edge of the first electrode layer 145. The second electrode layer 155 can be an anode electrode layer. For example, the second electrode layer 155 can include an anode electrode material. The anode electrode material can be laminated with at least one separator layer to form the second electrode layer 155. The second electrode layer 155 can include a first surface 157 and a second surface 159. The second electrode layer 155 can include a square or rectangular cross-sectional shape. For example, the second electrode layer 155 can include a thin, sheet-like profile. The second electrode layer 155 can include at least one edge (e.g., four edges). The second electrode layer 155 can include a generally rectangular shape and can include a protrusion (e.g., a projection) extending from an edge of the second electrode layer 155. For example, the second electrode layer 155 can include at least one electrode tab extending from an edge of the second electrode layer 155.

Figure 2:
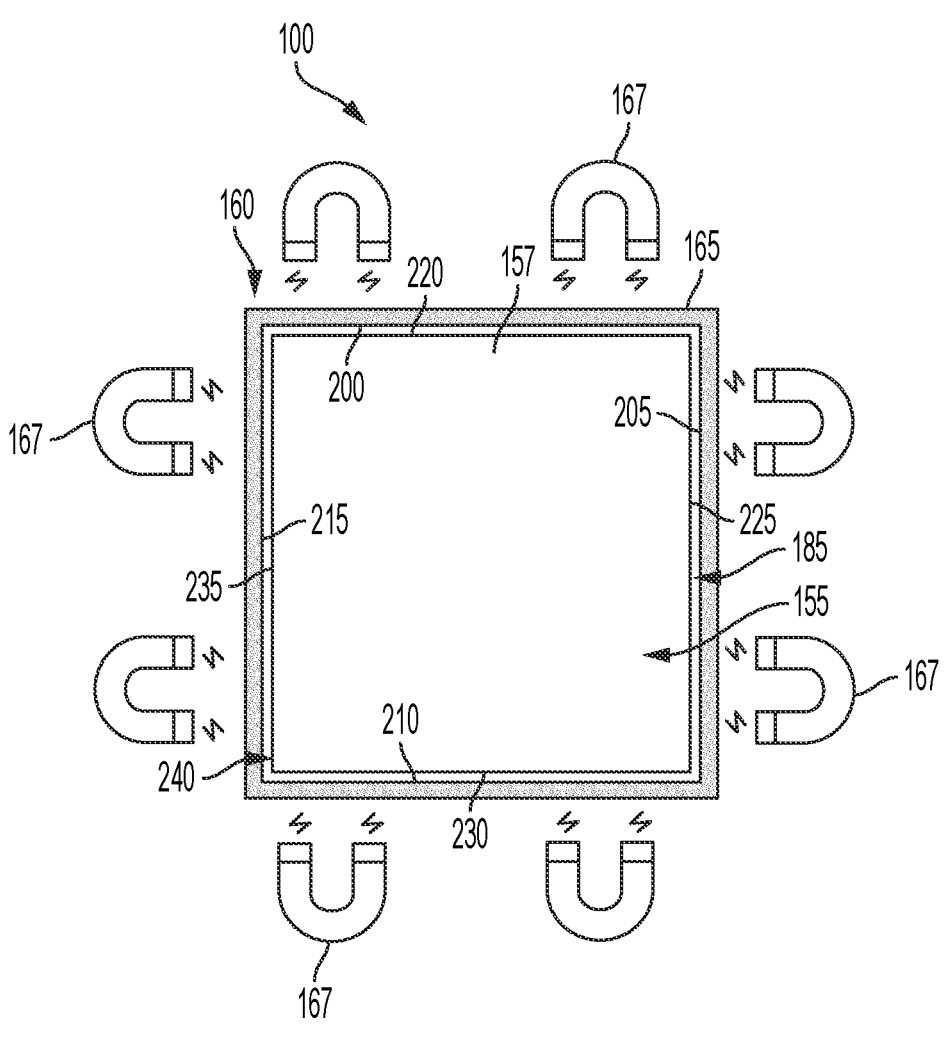
FIG. 2 depicts a top view of an example system for stacking electrode layers, in accordance with some aspects.

The cavity 185 of the magnetic well 160 can include a cross sectional shape and can have cross-sectional dimensions that allow for movement of an electrode layer through the cavity 185. For example, the cavity 185 can have a cross-sectional shape (e.g., rectangular, square, circular, oblong, triangular, hexagonal, or some other shape) that is similar to a cross sectional shape of the electrode layer. The electrode layer (e.g., electrode layer 145, electrode layer 155, or some other electrode layer 155) can move through (e.g., in, within, between a first portion and a second portion of, into, inside) the cavity 185 of the magnetic well 160 with a first surface (e.g., the first surface 147 or the first surface 157) or a second surface (e.g., the second surface 149 or the second surface 159) substantially perpendicular to the stacking direction 187 (e.g., +15 degrees from perpendicular). As depicted in FIG. 2, among others, the magnetic well 160 can have a square or rectangular cross-sectional shape. The magnetic well 160 can define the cavity 185 having a square or cross-sectional shape, as shown in FIG. 2. The magnetic well 160 can define the cavity 185 having a cross-sectional shape that differs from the cross sectional shape of the magnetic well 160. The cross-sectional shape of the electrode layer can be similar to the cross sectional shape of the cavity 185 such that the electrode layer can move through the cavity 185 without contacting the magnetic well 160. The cross-sectional dimensions of the electrode layer can be less than the cross-sectional dimensions of the cavity 185 of the magnetic well 160. For example, the electrode layer can be smaller than the cross-sectional dimensions of the cavity 185 such that the electrode layer can move through the cavity 185 without contacting the magnetic well 160. The electrode layer can move through the cavity 185 from a top 162 of the magnetic well 160 to a bottom 164 of the magnetic well 160 without contacting the magnetic well 160.

Referring to FIG. 2, among others, the magnetic well 160 and the cavity 185 can include a square or rectangular cross-sectional shape. The magnetic well 160 can include a first side 200, a second side 205, a third side 210, and a fourth side 215, for example. As depicted in FIG. 2, the electrode layer (shown as electrode layer 155) can include a square or rectangular cross-sectional shape. The electrode layer can For example, the electrode layer can include a first edge 220, a second edge 225, a third edge 230, and a fourth edge 235. A gap (e.g., space, void) can exist between the edges 220, 225, 230, 235 of the electrode layer and the sides 200, 205, 210, 215 of the magnetic well 160. For example, as the electrode layer moves through (e.g., in, within, into, inside, between at least a portion of sides 200, 205, 210, and 215 of) the cavity in the stacking direction 187, the gap 240 can exist between the first side 200 of the magnetic well 160 and the first edge 220 of the electrode layer. The gap 240 can exist between the second side 205 of the magnetic well 160 and the second edge 225 of the electrode layer. The gap 240 can exist between the third side 210 of the magnetic well 160 and the third edge 230 of the electrode layer. The gap 240 can exist between the fourth side 215 of the magnetic well 160 and the fourth edge 235 of the electrode layer. The gap 240 can be dynamic. For example, the gap 240 between one edge 220, 225, 230, 235 of the electrode layer and a respective side 200, 205, 210, 215 of the magnetic well 160 can vary as the electrode layer moves through the cavity 185. The electrode layer can move in a direction that is nonparallel to the stacking direction 187 as the electrode moves through the cavity 185. Despite a movement of the electrode layer in a direction that is nonparallel to the stacking direction, the electrode layer can avoid contacting the sides 200, 205, 210, 215 of the magnetic well as the electrode layer moves through the cavity 185.

The system 100 can include the magnet to generate a magnetic field within the magnetic well 160. For example, the magnetic well 160 can be or include at least one magnet 167. The magnet 167 can produce (e.g., generate, emit, or create) a magnetic field around the magnet. The magnet can be positioned relative to the magnetic well 160 such that at least a portion of the magnetic field extends within the cavity 185 of the magnetic well 160. For example, at least one of the sides 200, 205, 210, or 215 can be include a magnetic material (e.g., neodymium, cobalt, iron, or some other material) that can generate a magnetic field that extends into the cavity 185 when magnetized. The magnet 167 can be located within (e.g., integrated within, molded within, or otherwise coupled with) at least one of the sides 200, 205, 210, or 215 of the magnetic well 160. The magnet can be located proximate to at least one of the sides 200, 205, 210, 215 of the magnetic well 160 such that a magnetic field generated by the magnet extends into the cavity of the magnetic well 160.

The system 100 can include the magnet 167 as an electromagnet, where the magnetic field generated by the magnet 167 can be dynamic based upon a current applied to the magnet 167. For example, the magnet 167 can be a coil magnet. The magnet 167 can include a wire including at least one turn. For example, the magnet 167 can include multiple turns (e.g., 10, 20, 100, or some other number of turns). When a current is applied to (e.g., flows through) the wire, a magnetic field can be generated within an opening through the wire turns. For example, the cavity 185 of the magnetic well 160 can be an opening through the wire turns of the magnet 167. The magnetic well 160 can be a coil magnet where a side 200 of the magnetic well 160 can be the wire of the magnet 167. The magnitude (e.g., strength) of the magnetic field generated by an applied current can be proportional to the amperes applied to the wire. For example, a magnetic field generated when a first current is applied to the wire can be greater than a magnetic field generated by when a second and lesser current is applied to the wire. The magnet 167 can include a core that can include a ferromagnetic or ferrimagnetic material. For example, an iron core can be placed within the opening through the wire turns. The core can concentrate the magnetic field generated by the wire in order to increase the strength of the magnetic field. The magnet 167 can be communicably coupled with a computing system 197. For example, the computing system 197 can control a current applied to the magnet 167 in order to control the strength (e.g., magnitude) of the magnetic field generated by the magnet 167. By increasing a current applied to the wire of the magnet 167, the magnitude of the magnetic field generated by the wire can increase. By decreasing a current applied to the wire of the magnet 167, the magnitude of the magnetic field generated by the wire can decrease.

The system 100 can include the magnet to generate the magnetic field, where the magnetic field can interact with the electrode layer to control a movement of the electrode layer through (e.g., in, within, into, inside, between at least a portion of sides 200, 205, 210, and 215 of) the cavity 185. For example, the magnetic field generated by the magnet 167 can extend into the cavity 185 as the electrode layer (e.g., the electrode layer 145 or the electrode layer 155) moves through the cavity 185. Multiple (e.g., two, four, six, eight, ten, or some other number) of magnetic fields can interact with the electrode layer as the electrode layer moves through the cavity 185. A first magnetic field can interact with the electrode layer with the electrode layer within the cavity 185 and proximate the top 162 (e.g., closer to the top 162 of the magnetic well 160 than to the bottom 164) of the magnetic well. A second magnetic field can interact with the electrode layer with the electrode layer within the cavity 185 and proximate the bottom (e.g., closer to the bottom 164 of the magnetic well 160 than to the top 162).

The magnetic field can induce a current in the electrode layer as the electrode layer moves within the cavity 185. For example, as the electrode layer moves through (e.g., in, within, into, inside, between at least a portion of sides 200, 205, 210, and 215 of) the cavity 185 and interacts with the magnetic field, a current can be induced in the electrode layer. The electrode layer can include a cathode or anode material that is at least partially conductive. When the conductive material of the electrode layer is exposed to (e.g., interacts with, enters into, or otherwise contacts) the magnetic field within the cavity 185 while the electrode layer moves through the cavity 185, an electrical current can be generated within the electrode layer. For example, a magnetic force (e.g., magnetic lines of force) associated with the magnetic field can cause free electrons within the conductive electrode layer to move. For example, the movement of free electrons within the electrode layer can cause the electrode layer to generate a current. As the electrode layer moves through the cavity 185, the electrode layer can move through the magnetic field. A movement of the electrode layer through the magnetic field can expose the electrode layer to a changing magnetic field. The changing magnetic field can induce a current in the electrode layer.

The current induced in the electrode layer can create an induced magnetic field that opposes the magnetic field created by the magnet 167. For example, the induced current within the conductive electrode layer can induce (e.g., create, generate, cause) a magnetic field that acts in a direction to oppose a direction of the magnetic field created by the magnet 167 and located within the cavity 185. For example, the induced current within the conductive electrode layer can produce the induced magnetic field that opposes the magnetic field within the cavity 185 of the magnetic well 160. For example, if a magnetic field generated by the magnet 167 and extending within the cavity 185 includes magnetic lines of force extending in an upwards direction, the induced magnetic field can be generated by the induced current of the electrode layer that acts in a downwards direction in order to oppose the magnetic field generated by the magnet 167. The induced magnetic field can include a magnitude (e.g., strength) that is proportional or related to the magnetic field generated by the magnet 167. For example, a magnetic field generated by the magnet 167 and having a relatively small magnitude can cause the induced magnetic field to have a small magnitude relative to a magnetic field induced by the magnet 167 producing a magnetic field of a relatively large magnitude.

The induced magnetic field generated by the induced current within the electrode layer can interact with the magnetic field generated by the magnet 167 to control a movement of the electrode layer through (e.g., in, within, into, inside, between at least a portion of sides 200, 205, 210, and 215 of) the cavity 185. For example, the induced magnetic field can be generated by the current induced within the electrode layer as a result of the electrode layer moving through the magnetic field generated by the magnet 167. Because the induced magnetic field can act in a direction that opposes the magnetic field generated by the magnet 167, the induced magnetic field can cause a velocity or speed of the electrode layer to change as the electrode layer moves through the magnetic well 160. For example, because the induced magnetic field acts to oppose the magnetic field generated by the magnet 167, the electrode layer may move (e.g., fall, descend, travel) through the cavity 185 at a rate that is slower than a rate at which the electrode layer can move through the cavity 185 when no magnetic field is imposed by the magnet 167, such as when the electrode layer is only subject to gravitational forces. The presence of a magnetic field within the cavity 185 can cause the conductive electrode layer to descend through the magnetic well 160 at a controlled (e.g., slowed, reduced) rate. For example, the electrode layer can move through the cavity 185 in the stacking direction at a controlled rate so that the electrode layer can be received as it exits the cavity 185 (e.g., by a transfer pallet 190) in a controlled manner. Multiple electrode layers can simultaneously or consecutively move through the magnetic well 160 in a controlled manner such that multiple electrode layers can be received in a controlled manner as the multiple electrode layers exit the cavity 185. For example, multiple electrode layers can be consecutively received by a transfer pallet 190 after they exit the cavity 185. Because a movement of the multiple electrode layers is controlled (e.g., influenced, affected, slowed, decreased) via interaction with the magnetic field produced by the magnet 167, the multiple electrode layers can be stacked (e.g., with one electrode layer on top of another) in a controlled manner.

The system 100 can include the magnet 167 associated with a first section 165 of the magnetic well 160 and a second magnet 167 associated with a second section 170 of the magnetic well 160. For example, the magnetic well 160 can include a first section 165 and a second section 170, where the first section 165 and the second section 170 are separate portions (e.g., regions, areas, segments) of the magnetic well 160. The magnetic well 160 can be a unitary structure such that the first section 165, the second section 170, or any other sections can be integrally connected. The first section 165 and the second section 170 can form part of the same structure of the magnetic well 160. The first section 165 can be a separate component that is detachably coupled with the second section 170 to form the magnetic well 160. For example, the first section 165 can be a hollow tube-shaped member that extends for a first length in the stacking direction 187. The second section 170 can be a separate hollow tube-shaped member that extends in the stacking direction for a second length. The first section 165 can be detachably coupled with the second section 170 to form the magnetic well 160, where the magnetic well 160 can include a length that is approximately equal to the first length plus the second length, for example.

The first section 165 can be positioned proximate the top 162 of the magnetic well 160. For example, the first section 165 can be positioned closer to the top 162 of the magnetic well 160 than to the bottom of the magnetic well 160. The first section 165 can be positioned at or form the top 162 of the magnetic well 160. The second section 170 can be positioned proximate the bottom 164 of the magnetic well 160. For example, the second section 170 can be positioned closer to the bottom of magnetic well 160 than to the top of the magnetic well 160. The second section 170 can be positioned at or form the bottom 164 of the magnetic well 160. The second section 170 can be positioned beneath the first section 165 such that an object (e.g., an electrode layer) moving in the stacking direction 187 will move from a portion of the cavity 185 defined by the first section 165 to a portion of the cavity defined by the second section 170. The first section 165 can be positioned beneath the second section 170 such that an object (e.g., an electrode layer) moving in the stacking direction 187 will move from the portion of the cavity 185 defined by the second section 170 to the portion of the cavity 185 defined by the first section 165. The first section 165, the second section 170, and any other sections can be substantially identical (e.g., 90% similar in size, shape, material composition, etc.). For example, each section 165, 170 can be identical but associated with a separate magnet 167. The first section 165 can be a portion of the magnetic well 160 and a corresponding portion of the cavity 185 that is or includes the first magnet 167. The first magnet 167 can generate a first magnetic field. The second section 170 can be a portion of the magnetic well 160 and a corresponding portion of the cavity 185 that is or includes the second magnet 167. The second magnet 167 can generate a first magnetic field.

The system 100 can include the first magnet 167 associated with the first section to generate the first magnetic field and the second magnet 167 associated with the second section to generate the second magnetic field 167. For example, the first magnetic field generated by the first magnet 167 can extend into the portion of the cavity 185 corresponding to the first section 165. The second magnetic field generated by the second magnet 167 can extend into the portion of the cavity 185 corresponding to the second section 170. The first magnetic field can overlap with the second magnetic field such that magnetic force lines of the first magnetic field cross over magnetic force lines of the second magnetic field, for example. The first magnetic field can be separate from the second magnetic field such that magnetic force lines of the first magnetic field do not cross over magnetic force lines of the second magnetic field. The second magnetic field generated by the second magnet 167 can be different than the first magnetic field generated by the first magnet 167. For example, the second magnetic field can generate a magnetic force having a higher magnitude than a magnetic force generated by the first magnetic field. The second magnetic field can produce a magnetic force having a lesser magnitude than a magnetic force produced by the first magnetic field. The first magnet 167 and the second magnet 167 can be electromagnets that can generate a variable or dynamic magnetic field based on a current applied to the first magnet 167 or the second magnet 167, respectively. For example, the first magnet 167 and the second magnet 167 can receive a substantially similar (e.g., 95% similar) current and can generate a substantially similar magnetic field (e.g., 95% similar). The first magnet 167 can receive a first current that is less than a second current received by the second magnet 167 such that the first magnetic field generated by the first magnet 167 can have a lesser magnitude than a second magnetic field generated by the second magnet 167. The current provide to the first magnet 167 or the second magnet 167 can change such that the second magnetic field generated by the second magnet 167 can be stronger than the first magnetic field generated by the first magnet 167 at a first time, but less than the first magnetic field generated by the first magnet 167 at a second time.

The system 100 can include the first magnetic field generated by the first magnet 167 and the second magnetic field generated by the second magnet 167 to control the electrode layer. For example, the electrode layer can be controlled by the first magnetic field as the electrode layer moves through (e.g., in, within, into, inside, between at least a portion of sides 200, 205, 210, and 215 of) the cavity 185. A current induced in the electrode layer by virtue of the electrode layer moving through the first magnetic field can cause an induced magnetic field to be created that opposes the first magnetic field. The induced magnetic field can cause a velocity of the electrode layer moving in the stacking direction 187 within the portion of the cavity 185 associated with the first section 165 of the magnetic well 160 and thus associated with the first magnetic field to be slower than a velocity of an electrode layer moving in the stacking direction 187 by only gravitational forces. The electrode layer can be controlled by the second magnetic field as the electrode layer moves through the cavity 185. For example, a current induced in the electrode layer by virtue of the electrode layer moving through the second magnetic field can cause an induced magnetic field to be created that opposes the second magnetic field. The induced magnetic field can cause a velocity of the electrode layer moving in the stacking direction 187 within the portion of the cavity 185 associated with the second section 170 of the magnetic well 160 and thus associated with the second magnetic field to be slower than a velocity of an electrode layer moving in the stacking direction 187 by only gravitational forces.

The system 100 can include the electrode layer having a first velocity with the electrode layer within the portion of the cavity 185 associated with the first section 165 and a second velocity with the electrode layer within the portion of the cavity 185 associated with the second section 170. For example, the first magnet 167 can generate the first magnetic field that is different than the second magnetic field generated by the second magnet 167. The first magnetic field can induce a first induced magnetic field to oppose the first magnetic field as the electrode layer moves through the first section 165. The second magnetic field can induce a second induced magnetic field to oppose the second magnetic field as the electrode layer moves through the second section 170. The first induced magnetic field can be weaker than the second induced magnetic field with the first magnetic field weaker than the second magnetic field. The first velocity of the electrode layer can be greater (e.g., faster) than the second velocity of the electrode layer because the electrode layer is controlled by the weaker first induced magnetic field with the electrode layer in the first section 165. The weaker first induced magnetic field can allow the electrode layer to move through the portion of the cavity 185 associated with the first section 165 at a faster rate than the stronger second induced magnetic field. For example, the stronger the induced magnetic field, the slower the velocity of the electrode layer when that magnetic field is induced. An electrode layer can decelerate (e.g., slow, experience a reduction in velocity) as the electrode layer moves from the first section 165 to the second section 170. For example, as the electrode layer moves from the portion of the cavity 185 associated with the first section 165 and the first magnet 167 to the portion of the cavity 185 associated with the second section 170, the electrode layer can move from the first magnetic field to the second magnetic field. The second magnetic field can be stronger than the first magnetic field and can corresponding induce a stronger second induced magnetic field than the first induced magnetic field. The difference in strength of the first induced magnetic field and the second induced magnetic field can cause the velocity of the electrode layer to change. For example, the stronger induced second magnetic field can cause the electrode layer to decelerate.

The system 100 can include the first velocity of the first electrode layer with the first electrode layer in the first section 165 less than the second velocity of the first electrode layer with the first electrode layer in the second section 170. For example, the first induced magnetic field can be stronger than the second induced magnetic field with the first magnetic field stronger than the second magnetic field. The first velocity of the electrode layer can be less than (e.g., slower) the second velocity of the electrode layer because the electrode layer is controlled by the stronger first induced magnetic field with the electrode layer in the first section 165. The stronger first induced magnetic field can allow the electrode layer to move through (e.g., in, within, into, inside, between at least a portion of sides 200, 205, 210, and 215 of) the portion of the cavity 185 associated with the first section 165 at a slower rate than the weaker second induced magnetic field. For example, the stronger the induced magnetic field, the slower the velocity of the electrode layer when that magnetic field is induced. An electrode layer can accelerate (e.g., speed up, experience an increase in velocity) as the electrode layer moves from the first section 165 to the second section 170. For example, as the electrode layer moves from the portion of the cavity 185 associated with the first section 165 and the first magnet 167 to the portion of the cavity 185 associated with the second section 170, the electrode layer can move from the first magnetic field to the second magnetic field. The second magnetic field can be weaker than the first magnetic field and can corresponding induce a weaker second induced magnetic field than the first induced magnetic field. The difference in strength of the first induced magnetic field and the second induced magnetic field can cause the velocity of the electrode layer to change. For example, the weaker induced second magnetic field can cause the electrode layer to accelerate.

The system 100 can include the magnetic well 160 having multiple sections. Each section can include at least one magnet 167. For example, the magnetic well can include a first section 165, a second section 170, a third section 175, and a fourth section 180. The magnetic well 160 can include more sections (e.g., five sections, ten sections, thirty sections, or some other number), or the magnetic well 160 can include fewer sections (e.g., one section 165). Each magnet 167 associated with a respective section of the magnetic well 160 can be independently operated such that a magnetic field extending within a portion of the cavity 185 associated with each section can independently controlled. Because the magnetic field created by a magnet 167 associated with each section of the magnetic well 160 can be independently controlled, an electrode layer (or multiple electrode layers) can be controlled in a particular manner within a respective section of the magnetic well 160. For example, an electrode layer within the portion of the cavity 185 associated with in the second section 170 can have a velocity that is different than a velocity of the electrode layer with the electrode layer within a portion of the cavity 185 associated with the third section 175 or with the electrode layer within a portion of the cavity 185 associated with the fourth section 180, for example.

The system 100 can include a third magnet 167 associated with the third section 175 of the magnetic well 160. For example, the magnetic well 160 can include the third section 175 positioned between the first section 165 and the second section 170, where the first section 165 is positioned proximate the top 162 and the second section 170 is positioned proximate the bottom 164. As depicted in FIGS. 1 and 3, among others, the magnetic well 160 can include the third section 175 positioned adjacent the second section 170. For example, the magnetic well 160 can include the first section 165 positioned proximate the top 162, the third section 175 positioned proximate the bottom 164, and the second section 170 positioned between the first section 165 and the third section 175. The system 100 can include a fourth magnet 167 associated with the fourth section 180 of the magnetic well 160. For example, the magnetic well 160 can include the fourth section 180 positioned proximate the bottom 164. The fourth section 180 can be positioned adjacent the third section 175, as depicted in FIGS. 1 and 3, among others. For example, the magnetic well 160 can include the first section 165 positioned proximate the top 162, the second section 170 positioned adjacent to the first section 165, the third section 175 positioned adjacent the second, and the fourth section 180 positioned adjacent the third section 175 and proximate the bottom 164.

The system 100 can include the third magnet 167 associated with the third section 175 to generate a third magnetic field. For example, the third magnet 167 can create a third magnetic field. The third magnetic field can extend to a portion of the cavity 185 associated with the third section 175. The third magnetic field can interact with the electrode layer with the electrode layer within the portion of the cavity 185 associated with the third section 175. The system 100 can include the fourth section 180 associated with the fourth magnet 167 to generate a fourth magnetic field. For example, the fourth magnet 167 can create a fourth magnetic field. The fourth magnetic field can extend to a portion of the cavity 185 associated with the fourth section 180. The fourth magnetic field can interact with the electrode layer with the electrode layer within the portion of the cavity 185 associated with the fourth section 180.

The system 100 can include the cavity 185 to allow movement of a plurality of electrode layers through (e.g., in, within, into, inside, between at least a portion of sides 200, 205, 210, and 215 of) the cavity 185. For example, the cavity 185 can allow a first electrode layer (e.g., the first electrode layer 145) and a second electrode layer (e.g., the second electrode layer 155) to move through the magnetic well 160 in a consecutive manner. The first electrode layer can be spaced apart from the second electrode layer with the first and second electrode layers within the cavity 185. For example, a distance can exist between the first electrode layer and the second electrode layer with the first and second electrode layers within the cavity 185 of the magnetic well 160. The first electrode layer can be within the portion of the cavity 185 associated with one section (e.g., the second section 170 or the third section 175) while the second electrode layer can be within the portion of the cavity 185 associated with a different section (e.g., the first section 165 or the second section 170).

The system 100 can include the distance between the first electrode layer and the second electrode layer with the first electrode layer and the second electrode layer in the first section 165 greater than a distance between the first electrode layer and the second electrode layer with the first electrode layer and the second electrode layer in the third section 175. For example, the third section 175 can be adjacent to the first section 165 and positioned between the first section 165 and the second section 170. The third magnetic field generated by the third magnet 167 associated with the third section 175 can be greater than the first magnetic field generated by the first magnet 167 associated with the first section 165. For example, as the first electrode layer (e.g., the electrode layer 145) enters the portion of the cavity 185 associated with the third section 175 after exiting the portion of the cavity 185 associated with the first section 165, the first velocity of the first electrode layer can decrease. The first velocity of the first electrode layer with the first electrode layer in the portion of the cavity 185 associated with the third section 175 can be less than the second velocity of the second electrode layer (e.g., the electrode layer 155) with the second electrode layer in the portion of the cavity 185 associated with the first section 165. The second electrode layer can move through (e.g., in, within, into, inside, between at least a portion of sides 200, 205, 210, and 215 of) the portion of the cavity 185 associated with the first section 165 at a higher velocity than the first electrode layer can move through the portion of the cavity 185 associated with the third section 175 such that the distance between the first electrode layer and the second electrode layer can decrease (e.g., the second electrode layer can approach the first electrode layer).

The system 100 can include the distance between the first electrode layer and the second electrode layer with the first electrode layer and the second electrode layer in the third section 175 greater than a distance between the first electrode layer and the second electrode layer with the first electrode layer and the second electrode layer in the second section 170. For example, the third section 175 can be adjacent to the first section 165 and positioned between the first section 165 and the second section 170. The second magnetic field generated by the second magnet 167 associated with the second section 170 can be greater than the third magnetic field generated by the third magnet 167 associated with the third section 175. For example, as the first electrode layer (e.g., the electrode layer 145) enters the portion of the cavity 185 associated with the second section 170 after exiting the portion of the cavity 185 associated with the third section 175, the first velocity of the first electrode layer can decrease. The first velocity of the first electrode layer with the first electrode layer in the portion of the cavity 185 associated with the second section 170 can be less than the second velocity of the second electrode layer (e.g., the electrode layer 155) with the second electrode layer in the portion of the cavity 185 associated with the third section 175. The second electrode layer can move through (e.g., in, within, into, inside, between at least a portion of sides 200, 205, 210, and 215 of) the portion of the cavity 185 associated with the third section 175 at a higher velocity than the first electrode layer can move through the portion of the cavity 185 associated with the second section 170 such that the distance between the first electrode layer and the second electrode layer can decrease (e.g., the second electrode layer can approach the first electrode layer).

The system 100 can include the magnet 167 as an electromagnet and a computing system 197 operatively coupled with the magnet 167 and configured to provide an adjustable current to the magnet 167. For example, the magnet 167 can be an electromagnet that can generate a magnetic field based on a current applied to a wire of the magnet 167. As a current provided to the magnet 167 increases, the strength of the magnetic field generated by the magnet 167 can increase. As a current provided to the magnet 167 decreases, the strength of the magnetic field generated by the magnet 167 can decrease. The strength of the magnetic field generated by the magnet 167 can change (e.g., be variable or dynamic) based upon the current applied to the magnet 167. The computing system 197 can control an amount of current that is provided to wire of the magnet 167. For example, the computing system 197 can alter the current provided to the wire of the magnet 167 by changing a resistance or a voltage of an electrical circuit associated with the wire of the magnet 167. The computing system 197 can be or include a controller that can modulate (e.g., alter, adjust, change, increase, decrease) the voltage or resistance of the electrical circuit associated with the magnet 167 to dynamically change the current provided to the magnet 167 to increase the strength of the magnetic field generated by the magnet 167.

The system 100 can include at least one shroud or cover surrounding the magnetic well 160. For example, and as depicted in FIG. 3, among others, the magnetic well 160 can be surrounded by a shroud or cover 300. The cover 300 can reduce any disturbances to the magnetic well in order to facilitate precision control of the electrode layer via a magnetic field within the cavity 185 of the magnetic well 160. For example, the cover 300 can reduce or substantially eliminate (e.g., eliminate ±90%) of potential disturbances such as airflow, particulate matter, harmonic interferences, or other disturbances. The cover 300 can be closed or partially open. For example, the cover 300 can be open to allow for the electrode layer to be provided to the magnetic well 160 or to exit the magnetic well 160. The cover 300 can include a moveable top or bottom portion that can be selectively opened or closed to allow an electrode layer to be provided to the magnetic well 160 or exit the magnetic well 160.

The system 100 can include at least one transfer pallet 190 positioned proximate the bottom 164 of the magnetic well 160, the transfer pallet 190 to receive the electrode layer after the electrode layer passes through (e.g., in, within, into, inside, between at least a portion of sides 200, 205, 210, and 215 of) the cavity 185 of the magnetic well 160. For example, the transfer pallet 190 can receive multiple electrode layers 145, 155 to form an electrode layer stack 199. The transfer pallet 190 can include at least one guide 194. The guide 194 can define a cavity 192 in the transfer pallet 190. The cavity 192 can include a cross-sectional shape that is similar to the cross-sectional shape of electrode layers forming the electrode layer stack 199 and cross-sectional dimensions that are substantially similar (e.g., ±1-5% dimensional variance) to the cross-sectional dimensions of the electrode layers forming the electrode layers stack 199. For example, an electrode layer can fit within the cavity 192 or be received by the cavity 192 such that the edges of the electrode layer (e.g., edges 220, 225, 230, or 235 as shown in FIG. 2, among others) can be proximate the guide 194. The guide 194 can be moveable. For example, the guide can move closer to or away from an edge of the electrode layer with the electrode layer within the cavity 192. The guide 194 can move (e.g., slide, translate, raise, lower, extend, retract) to contact the electrode layer, avoid contact with an electrode layer, accommodate an electrode layer of various sizes, accommodate the electrode layer stack 199 (e.g., multiple electrode layers stacked on top of one another), or otherwise be configured to receive an electrode layer. The electrode layer stack 199 can include multiple electrode layers (e.g., electrode layers 145 and electrode layers 155) aligned in an edge-to-edge manner or in a center-to-center manner. The transfer pallet 190 can be positioned proximate the bottom 164 of the magnetic well 160 such that an electrode layer that exits the cavity 185 of the magnetic well 160 can be received within the cavity 192 of the transfer pallet 190. For example, the electrode layer can move through the magnetic well 160 (e.g., from the top 162 to the bottom 164) and exit the cavity 185 of the magnetic well 160 via the bottom 164. The transfer pallet can be positioned such that the electrode layer can be received in the cavity 192. An orientation of the electrode layer can remain substantially unchanged (e.g., <5% change in orientation) as the electrode layer is received in the cavity 192 of the transfer pallet 190. For example, a surface (e.g., the first surface 147, 157 or the second surface 149, 159) can be perpendicular to the stacking direction 187.

The transfer pallet 190 can be moveable with respect to the magnetic well 160 For example the transfer pallet 190 can receive multiple electrode layers within the cavity 192 to from an electrode layer stack. The electrode layer stack can include multiple electrode layers stacked on top of each other and positioned within the cavity 192 formed by the guide 194. For example, the electrode layer stack can include a predetermined number of electrode layers stacked in the cavity 192, where the predetermined number of electrode layers corresponds with a housing of battery (e.g., a prismatic or pouch solid state battery). With the electrode layer stack received in the cavity 192 of the transfer pallet 190, the transfer pallet 190 can move (e.g., pivot, slide, translate, retract) from the bottom 164 of the magnetic well 160. The transfer pallet 190 can be moveable to move the electrode layer stack to another machine or system for further processing. For example, the transfer pallet can be moveable from the magnetic well 160 so that the electrode layer stack can be wrapped (e.g., wrapped in an electrolyte material or separator layer) or inserted into a battery housing.

The system 100 can include at least one conveyor device 105 to provide the electrode layer to the magnetic well, the conveyor device 105 including a conveyor surface 107 and at least one roller 110. For example, the electrode layer can be provided to the top 162 of the magnetic well 160 via the conveyor device 105. The conveyor surface 107 of the conveyor device 105 can receive a singulated (e.g., individual, single, cut, separated) electrode layer and can provide the electrode layer to the magnetic well 160 for stacking with other electrode layers. The conveyor surface 107 can be coupled with the roller 110. The roller can rotate, causing the conveyor surface 107 to move towards the top 162 of the magnetic well 160.

The system 100 can include at least one first conveyor device 105 to provide the electrode layer to the magnetic well 160. For example, the roller 110 of the first conveyor device 105 can cause the conveyor surface 107 to move in a first direction 115. The first conveyor device 105 can include the conveyor surface 107 to receive the electrode layer. The first conveyor device 105 can include the conveyor surface 107 moving in the first direction 115 to provide the received electrode layer to the top 162 of the magnetic well 160. The electrode layer can be the first electrode layer 145. The first electrode layer 145 can be a singulated cathode electrode layer, where the singulated cathode electrode layer can include a cathode electrode material 120 laminated with an electrolyte or separator material 125. Multiple first electrode layers 145 can be provided to the conveyor surface 107 of the first conveyor device 105. The roller 110 of the first conveyor device 105 can rotate at a predetermined rate (e.g., a constant or variable rate) to cause the first electrode layer 145 to move towards the magnetic well 160. The conveyor surface 107 can move at a constant rate to provide multiple first electrode layers 145 to the magnetic well 160 at regular intervals (e.g., one layer per second, one layer per two seconds, twenty layers per minute, or some other rate). The conveyor surface 107 can move first electrode layer 145 in the first direction 115 towards the magnetic well 160. As the electrode layer 145 reaches an end of the conveyor surface 107 proximate the roller 110 (i.e., a position on the conveyor device 105 where the conveyor surface 107 wraps around the roller 110), the conveyor device 105 can provide the first electrode layer 145 to the top 162 of the magnetic well 160. For example, the conveyor surface 107 can move around the roller 110 at the end of the conveyor device 105, at which point the first electrode layer 145 can fall off (e.g., depart from, move away from, separate from) the conveyor surface 107. The end of the conveyor device 105 can be positioned proximate the top 162 of the magnetic well 160 such that the first electrode layer 145 can move directly from the conveyor device 105 to the cavity 185 of the magnetic well 160.

The system 100 can include at least one first cutting device 140 cut (e.g., singulate, separate, slice) the first electrode layer 145 from a roll of cathode electrode material 120. For example, the cathode electrode material 120 can be cut into a layer or sheet having particular dimensions, rather than as a continuous sheet. The cathode electrode material 120 can be provided to the cutting device 140 of the system 100 from at least one roll 122. The cutting device 140 can cut a sheet (e.g., layer, web, singulated layer, or portion) from the roll 122 prior to or as the cathode electrode material 120 is provided to the conveyor surface 107 of the first conveyor device 105. For example, the cutting device 140 can cut at least one first electrode layer 145 comprising the cathode electrode material 120 from the roll 122. The cutting device 140 can be a mechanical cutter using a rolling or non-rolling blade. The cutting device 140 can be a laser cutter or other contactless cutting device. Each of the electrode layers 145 comprising the cathode electrode material 120 can be provided to the conveyor device 105 a feeder device (e.g., web handling device, roller, or other element), where the feeder device guides the first electrode layer 145 onto the conveyor surface 107 of the first conveyor device 105.

The system 100 can include a lamination device 130 including at least one laminating roller 135 to laminate a first sheet of material with a second material to form a laminated electrode sheet. For example, the lamination device 130 can include a first roller 135 and a second roller 135. The first sheet of material can be the cathode electrode material 120, which can be a continuous sheet of cathode electrode material 120 provided via the roll 122. The second sheet of material can be a electrolyte or separator material 125, which can be a continuous sheet of electrolyte or separator material 125 provided via the roll 127. The system 100 can include a first roll 127 of electrolyte or separator material 125 and a second roll 127 of separator material. The cathode electrode material 120 can be provided between the first roller 135 and the second roller 135. The electrolyte or separator material 125 from the first roll 127 can be provided between the first roller 135 and the cathode electrode material 120 such that the electrolyte or separator material 125 from the first roll 127 is positioned to a first side of the cathode electrode material 120. The electrolyte or separator material 125 from the second roll 127 can be provided between the second roller 135 and the cathode electrode material 120 such that the electrolyte or separator material 125 from the first roll 127 is positioned to a second side of the cathode electrode material 120. As the cathode electrode material 120 and the electrolyte or separator material 125 is drawn through the lamination device 130, the electrolyte or separator material 125 from the first roller 127 can be laminated with a first side of the cathode electrode material 120. As the cathode electrode material 120 and the electrolyte or separator material 125 is drawn through the lamination device 130, the electrolyte or separator material 125 from the second roller 127 can be laminated with the second side of the cathode electrode material 120. The cathode electrode material 120 can be laminated with the electrolyte or separator material 125 to form a first electrode sheet. The first electrode sheet can be provided to first cutting device 140 to be singulated (e.g., cut, separated, divided, sliced) to form the first electrode layer 145. The lamination device 130 can apply pressure to the cathode electrode material 120 and the electrolyte or separator material 125 between the first roller 135 and the second roller 135 to join the cathode electrode material 120 and the electrolyte or separator material 125. The lamination device 130 can apply heat to the cathode electrode material 120 and the electrolyte or separator material 125 between the first roller 135 and the second roller 135 to join the cathode electrode material 120 and the electrolyte or separator material 125. The lamination device 130 or the system 100 can laminate the electrolyte or separator material 125 to the cathode electrode material using a joining method (e.g., heat, adhesive, liquid surface tension, or other joining method).

The system 100 can include a second conveyor device to provide a second electrode layer to the magnetic well 160. For example, the conveyor device 105 can be a second conveyor device 105. The roller 110 can cause the conveyor surface 107 to move in a second direction 117. The second conveyor device 105 can receive a second electrode layer. For example, the second conveyor device 105 can receive the second electrode layer 155. The second electrode layer 155 can be or include a singulated anode electrode layer. The second conveyor device 105 can include the conveyor surface 107 moving in the second direction 117 to provide the second electrode layer (e.g., the electrode layer 155) to the top 162 of the magnetic well 160. Multiple second electrode layers 155 can be provided to the conveyor surface 107 of the second conveyor device 105. The roller 110 of the second conveyor device 105 can rotate at a predetermined rate (e.g., a constant or variable rate) to cause the second electrode layer 155 to move towards the magnetic well 160. The conveyor surface 107 can move at a constant rate to provide multiple second electrode layers 155 to the magnetic well 160 at regular intervals (e.g., one layer per second, one layer per two seconds, twenty layers per minute, or some other rate). The conveyor surface 107 can move the second electrode layer 155 in the second direction 117 towards the magnetic well 160. As the second electrode layer 155 reaches an end of the conveyor surface 107 proximate the roller 110 (i.e., a position on the conveyor device 105 where the conveyor surface 107 wraps around the roller 110), the conveyor device 105 can provide the second electrode layer 155 to the top 162 of the magnetic well 160. For example, the conveyor surface 107 can move around the roller 110 at the end of the conveyor device 105, at which point the second electrode layer 155 can fall off (e.g., depart from, move away from, separate from) the conveyor surface 107. The end of the conveyor device 105 can be positioned proximate the top 162 of the magnetic well 160 such that the second electrode layer 155 can move directly from the conveyor device 105 to the cavity 185 of the magnetic well 160.

The system 100 can include at least one second cutting device 140 to cut (e.g., singulate, separate, slice) the second electrode layer 155 from a roll of material. For example, the second electrode layer 155 can be or include an anode electrode material 150 that is provided to the second cutting device 140 of the system via a roll 152. The anode electrode material 150 can be cut from a continuous sheet (e.g., a rolled film) into a layer or sheet having particular discrete dimensions. The second cutting device 140 can cut a sheet (e.g., layer, web, singulated layer, or portion) from the roll 152 prior to or as the anode electrode material 150 is provided to the conveyor surface 107 of the second conveyor device 105. For example, the second cutting device 140 can cut at least one singulated anode electrode layer 155 comprising the anode electrode material 150 from the roll 152. The second cutting device 140 can be a mechanical cutter using a rolling or non-rolling blade. The second cutting device 140 can be a laser cutter or other contactless cutting device. Each of the second electrode layers 155 comprising the anode electrode material 150 can be provided to the conveyor device 105 a feeder device (e.g., web handling device, roller, or other element), where the feeder device guides the second electrode layer 155 onto the conveyor surface 107 of the second conveyor device 105.

The system 100 can include a third conveyor device to provide an electrolyte or separator layer to the magnetic well 160. For example, the conveyor device 105 can be a third conveyor device 105. The roller 110 can cause the conveyor surface 107 to move in a third direction, where the third direction can be the same as or different form the first direction 115 or the second direction 117. The third conveyor device 105 can receive an electrolyte or separator material. For example, the third conveyor device 105 can receive the electrolyte or separator material 125. The electrolyte or separator material 125 can be or include a singulated electrolyte or separator layer. The third conveyor device 105 can include the conveyor surface 107 moving in the third direction to provide the electrolyte or separator material 125 to the top 162 of the magnetic well 160. Multiple singulated sheets or layers of the electrolyte or separator material 125 can be provided to the conveyor surface 107 of the third conveyor device 105. The roller 110 of the third conveyor device 105 can rotate at a predetermined rate (e.g., a constant or variable rate) to cause the electrolyte or separator material 125 to move towards the magnetic well 160. The conveyor surface 107 can move at a constant rate to provide multiple singulated sheets or layers of electrolyte or separator material 125 to the magnetic well 160 at regular intervals (e.g., one layer per second, one layer per two seconds, twenty layers per minute, or some other rate). The conveyor surface 107 can move a sheet or layer of electrolyte or separator material 125 in the third direction towards the magnetic well 160. As the sheet or layer of electrolyte or separator material 125 reaches an end of the conveyor surface 107 proximate the roller 110 (i.e., a position on the conveyor device 105 where the conveyor surface 107 wraps around the roller 110), the conveyor device 105 can provide the electrolyte or separator material 125 to the top 162 of the magnetic well 160. For example, the conveyor surface 107 can move around the roller 110 at the end of the conveyor device 105, at which point the sheet or layer electrolyte or separator material 125 can fall off (e.g., depart from, move away from, separate from) the conveyor surface 107. The end of the conveyor device 105 can be positioned proximate the top 162 of the magnetic well 160 such that the sheet or layer of electrolyte or separator material 125 can move directly from the third conveyor device 105 to the cavity 185 of the magnetic well 160.

The system 100 can include at least one third cutting device 140 to cut (e.g., singulate, separate, slice) the electrolyte or separator material 125 from a roll of material. For example, the sheet or layer of electrolyte or separator material 125 can be or include an electrolyte or separator material that is provided to the third cutting device 140 of the system via a roll 127. The electrolyte or separator material 125 can be cut from a continuous sheet (e.g., a rolled film) into a layer or sheet having particular discrete dimensions. The third cutting device 140 can cut a sheet (e.g., layer, web, singulated layer, or portion) from the roll 127 prior to or as the electrolyte or separator material 125 is provided to the conveyor surface 107 of the third conveyor device 105. For example, the third cutting device 140 can cut at least one singulated layer or sheet of electrolyte or separator material 125 comprising the electrolyte or separator material 125 from the roll 127. The third cutting device 140 can be a mechanical cutter using a rolling or non-rolling blade. The third cutting device 140 can be a laser cutter or other contactless cutting device. Each of the sheets or layers of electrolyte or separator material 125 can be provided to the conveyor device 105 a feeder device (e.g., web handling device, roller, or other element), where the feeder device guides the sheet or layer of electrolyte or separator material 125 onto the conveyor surface 107 of the third conveyor device 105.

The sheet or layer of electrolyte or separator material 125 can be provided to the cavity 185 of the magnetic well 160 before or after the first electrode layer 145 or the second electrode layer 155. For example, the sheet or layer of electrolyte or separator material 125 can be provided to the cavity 185 before the first electrolyte layer 145 is provided to the cavity 185 such that the sheet or layer of electrolyte or separator material 125 is positioned between the first electrode layer 145 and the transfer pallet 190 after the sheet or layer of electrolyte or separator material 125 and the first electrode layer 145 pass through (e.g., in, within, into, inside, between at least a portion of sides 200, 205, 210, and 215 of) the cavity 185. The sheet or layer of electrolyte or separator material 125 can be provided to the cavity 185 between the first electrode layer 145 and the second electrode layer 155. For example, the first electrode layer 145 can be provided to the cavity 185, followed by the sheet or layer of electrolyte or separator material 125, followed by the second electrode layer 155. The second electrode layer 155 can be provided to the cavity 185 before the sheet or layer of electrolyte or separator material 125, after which the first electrode layer 145 can be provided to the cavity 185. The sheet or layer of electrolyte or separator material 125 can be positioned between various first electrode layers 145 and second electrode layers 155 such that the no first electrode layer 145 is directly adjacent a second electrode layer 155.

The lamination device 130 can be integrated with the first conveyor device 105 or another conveyor device 105. For example, the system 100 can include the lamination device 130 to perform a lamination operation as the first electrode layer 145 is provided to the first conveyor device 105. The lamination device 130 can be located remotely from the system 100. For example, the system 100 can exclude the lamination device 130, where the lamination device 130 or some other lamination device is located remote from the system 100. The remote lamination device 130 can laminate an electrode layer (e.g., electrode layer 120) with an electrolyte or separator material (e.g., the electrolyte or separator material 125), and the laminated electrode layer can be provided to the system 100 in a subsequent operation. The cutting device 140 for can be integrated with the remote lamination device 130 such that a singulated electrode layer (e.g., first electrode layer 145) can be produced remotely from the system 100 and subsequently provided to the system 100.

The system 100 can include a degaussing device to degauss an electrode layer stack 199. For example, the system 100 can include a degaussing device to remove any magnetic artifacts within an electrode layer stack 199 once the electrode layer stack 199 is within the cavity 192 of the transfer pallet 190. The electrode layer stack 199 can include at least one first electrode layer 145 and at least one second electrode layer 155. For example, the electrode layer stack 199 can include multiple (e.g., 10, 20, 35, 50, or some other number) first electrode layers 145 and multiple (e.g., 10, 20, 35, 50, or some other number) second electrode layers 155 stacked within the cavity 192 of the transfer pallet 190. Because each of the first electrode layers 145 and second electrode layers 155 have passed through (e.g., in, within, into, inside, between at least a portion of sides 200, 205, 210, and 215 of) the cavity 185 of the magnetic well where each of the electrode layers 145, 155 was exposed to (e.g., controlled by) a magnetic field and experienced an induced magnetic field, a magnetic artifact (e.g., a magnetized particle) can exist on or within the electrode layer 145, 155 after exiting the cavity 185. The magnetic artifact can affect electrical performance of a battery cell including the electrode layer stack 199. The degaussing device can completely demagnetize or substantially demagnetize (e.g., ±95% of magnetic artifacts demagnetized) any magnetic artifacts in the electrode layer stack 199. The degaussing device can be or include an electromagnetic degausser or a permanent magnet degausser, for example.

Figure 4:
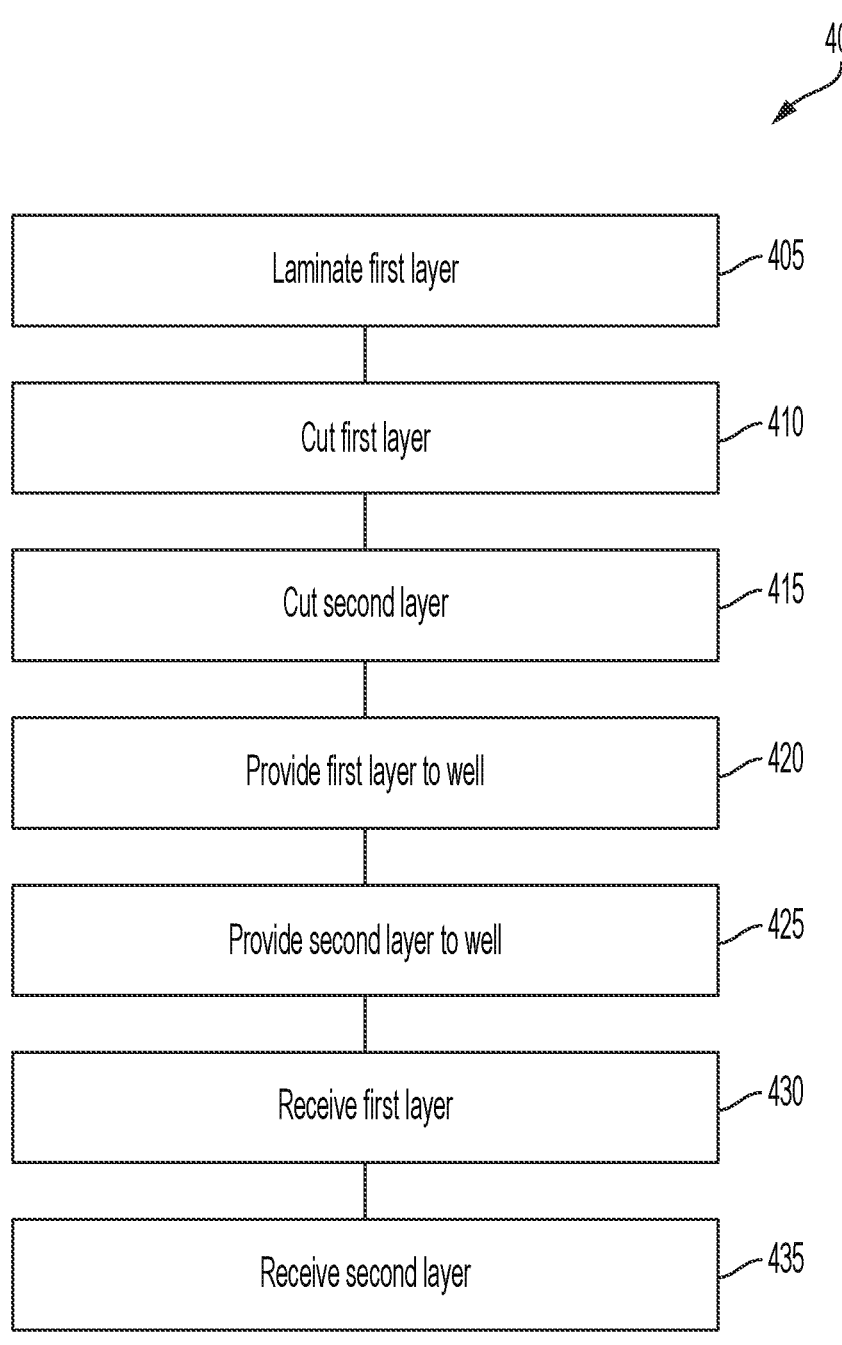
FIG. 4 is a flow chart of an example method for stacking electrode layers, in accordance with some aspects.

FIG. 4 depicts a flow chart of a method 400 for stacking electrode layers. The method can be performed by the system 100 shown in FIGS. 1-3 or by some other system. The method 400 can include at least one of ACTS 405-445.

The method 400 can include laminating a first layer at ACT 405. For example, the method 400 can include laminating a cathode electrode material 120 with an electrolyte or separator material 125 via the lamination device 130 at ACT 405. The cathode electrode material 120 and at least one electrolyte or separator material 125 can be provided to the lamination device 130 between the first roller 135 and the second roller 135 of the lamination device 130. As the cathode electrode material 120 and the electrolyte or separator material 125 is drawn (e.g., is pulled, moves, travels) through the lamination device 130 between the first roller 135 and the second roller 135, the electrolyte or separator material 125 can be laminated with at least one side of the cathode electrode material. For example, a first electrolyte or separator material 125, the cathode electrode material 120, and a second electrolyte or separator material 125 can be provided between the first roller 135 and the second roller 135 of the lamination device 130, where the first electrolyte or separator material 125 is positioned between the first roller 135 and a first side of the cathode electrode material 120 and the second electrolyte or separator material 125 is positioned between the second roller 135 and a second side of the cathode electrode material 120. The lamination device 130 can apply pressure, heat, or use some other joining method to laminate the first electrolyte or separator material 125 to the first side of the cathode electrode material 120 and to laminate the second electrolyte or separator material 125 to the second side of the cathode electrode material 120. The cathode electrode material 120 and the electrolyte or separator material 125 can be laminated to form a cathode electrode sheet.

The method 400 can include cutting the first layer at ACT 410. For example, the method 400 can include cutting, via the first cutting device 140, the cathode electrode sheet produced at ACT 405 to form the first electrode layer 145. The first cutting device 140 can include a cutting element (e.g., at least one blade, a laser, water-cutter, or some other cutting means) that can cut (e.g., singulate, separate, slice) the cathode electrode sheet to form the first electrode layer 145. For example, the first electrode layer 145 can include a first surface 147, a second surface 149, a first edge 220, a second edge 225, a third edge 230, and a fourth edge 235 and can have a square or rectangular shape. As the first cutting device 140 cuts the first electrode layer 145 from the cathode electrode sheet, the first electrode layer 145 can be received by the conveyor surface 107 of the first conveyor device 105.

The method 400 can include cutting a second layer at ACT 415. For example, the method 400 can include cutting, via the second cutting device 140, the anode electrode material to form the second electrode layer 155. The second cutting device 140 can include a cutting element (e.g., at least one blade, a laser, water-cutter, or some other cutting means) that can cut (e.g., singulate, separate, slice) the anode electrode material to form the second electrode layer 155. For example, the second electrode layer 155 can include a first surface 157, a second surface 159, a first edge 220, a second edge 225, a third edge 230, and a fourth edge 235 and can have a square or rectangular shape. As the second cutting device 140 cuts the second electrode layer 155 from the anode electrode material, the second electrode layer 155 can be received by the conveyor surface 107 of the second conveyor device 105.

The method 400 can include providing the first layer to a well at ACT 420. For example, the method 400 can include providing the first electrode layer 145 to the magnetic well 160 at ACT 420. The method 400 can include providing the first electrode layer 145 to the cavity 185 of the magnetic well 160. The first electrode layer 145 can move through (e.g., in, within, into, inside, between at least a portion of sides 200, 205, 210, and 215 of) the cavity 185 of the magnetic well 160 in the stacking direction 187. The magnetic well 160 can generate a magnetic force to control a movement of the first electrode layer 145 through the magnetic well 160. The first conveyor device 105 can receive the singulated first electrode layer 145 from the first cutting device 140 at ACT 410. The first conveyor device 105 can include the roller 110 coupled with the conveyor surface 107, where the roller 110 can move the conveyor surface 107 in the first direction 115. The first electrode layer 145 can rest or ride on the conveyor surface 107 such that the first electrode layer 145 moves with the conveyor surface 107. The conveyor surface 107 can move first electrode layer 145 in the first direction 115 towards the magnetic well 160. As the first electrode layer 145 reaches an end of the conveyor surface 107 proximate the roller 110 (i.e., a position on the conveyor device 105 where the conveyor surface 107 wraps around the roller 110), the conveyor device 105 can provide the first electrode layer 145 to the top 162 of the magnetic well 160. For example, the conveyor surface 107 can move around the roller 110 at the end of the conveyor device 105, at which point the first electrode layer 145 can fall off (e.g., depart from, move away from, separate from) the conveyor surface 107. The end of the conveyor device 105 can be positioned proximate the top 162 of the magnetic well 160 such that the first electrode layer 145 can move directly from the conveyor device 105 to the cavity 185 of the magnetic well 160. The conveyor device 105 can provide the first electrode layer 145 to the cavity 185 of the magnetic well 160 with the first surface 147 or the second surface 149 of the first electrode layer 145 can be perpendicular to the stacking direction 187. The first electrode layer 145 can be provided to the magnetic well 160 before the second electrode layer 155 is provided to the magnetic well 160 at ACT 425. For example, the multiple instances of the first electrode layer 145 and the second electrode layer 155 can enter the cavity 185 of the magnetic well 160 in an alternating fashion such that the electrode layers 145, 155 can be received at ACTS 430-435 in an alternating fashion.

The method 400 can include providing the second layer to the well at ACT 425. For example, the method 400 can include providing the second electrode layer 155 to the magnetic well 160 at ACT 425. The method 400 can include providing the second electrode layer 155 to the cavity 185 of the magnetic well 160. The second electrode layer 155 can move through (e.g., in, within, into, inside, between at least a portion of sides 200, 205, 210, and 215 of) the cavity 185 of the magnetic well 160 in the stacking direction 187. The magnetic well 160 can generate a magnetic force to control a movement of the second electrode layer 155 through the magnetic well 160. The second conveyor device 105 can receive the singulated second electrode layer 145 from the second cutting device 140 at ACT 415. The second conveyor device 105 can include the roller 110 coupled with the conveyor surface 107, where the roller 110 can move the conveyor surface 107 in the second direction 117. The second electrode layer 155 can rest or ride on the conveyor surface 107 such that the second electrode layer 155 moves with the conveyor surface 107. The conveyor surface 107 can move second electrode layer 155 in the second direction 117 towards the magnetic well 160. As the second electrode layer 155 reaches an end of the conveyor surface 107 proximate the roller 110 (i.e., a position on the conveyor device 105 where the conveyor surface 107 wraps around the roller 110), the conveyor device 105 can provide the second electrode layer 155 to the top 162 of the magnetic well 160. For example, the conveyor surface 107 can move around the roller 110 at the end of the conveyor device 105, at which point the second electrode layer 155 can fall off (e.g., depart from, move away from, separate from) the conveyor surface 107. The end of the conveyor device 105 can be positioned proximate the top 162 of the magnetic well 160 such that the second electrode layer 155 can move directly from the conveyor device 105 to the cavity 185 of the magnetic well 160. The conveyor device 105 can provide the second electrode layer 155 to the cavity 185 of the magnetic well 160 with the first surface 157 or the second surface 159 of the second electrode layer 155 can be perpendicular to the stacking direction 187. The second electrode layer 155 can be provided to the magnetic well 160 after the first electrode layer 145 is provided to the magnetic well 160 at ACT 420. For example, the multiple instances of the first electrode layer 145 and the second electrode layer 155 can enter the cavity 185 of the magnetic well 160 in an alternating fashion such that the electrode layers 145, 155 can be received at ACTS 430-435 in an alternating fashion.

The method 400 can include receiving the first layer at ACT 430. For example, the method 400 can include receiving the first electrode layer 145 in the cavity 192 of the transfer pallet 190. The transfer pallet 190 can be positioned proximate the bottom 164 of the magnetic well 160 and can be positioned to receive the first electrode layer 145 after the first electrode layer 145 has passed through (e.g., in, within, into, inside, between at least a portion of sides 200, 205, 210, and 215 of) the cavity 185 of the magnetic well 160 and has exited the bottom 164 of the magnetic well 160. The first electrode layer 145 can be received within the cavity 192 of the transfer pallet 190, where the cavity 192 can be defined by the guide 194. The guide 194 can be precisely positioned to create a cavity 192 that has dimensions proximate to dimensions of the first electrode layer 145. The first electrode layer 145 can be placed in a precise location within cavity 192 of the transfer pallet 190 such that the position of the first electrode layer 145 can be known with a high degree of accuracy (e.g., ±98% accuracy). The first electrode layer 145 can be provided to the top 162 of the magnetic well 160 at ACT 420 and moves through the cavity 185 of the magnetic well 160 in the stacking direction 187. The first electrode layer 145 can move through least one magnetic field within the cavity 185 of the magnetic well 160, which can create an induced magnetic field that opposes the magnetic field within the cavity 185 of the magnetic well 160. The induced magnetic field that opposes the magnetic field within the cavity 185 can act on the first electrode layer 145 to control the movement of the first electrode layer 145 through the cavity 185. For example, the induced magnetic field can reduce a velocity of the first electrode layer 145 as the first electrode layer 145 moves through the magnetic well 160. The first electrode layer 145 can have a reduced velocity as the first electrode layer 145 exits the cavity 185. The reduced velocity of the first electrode layer 145 can enable the transfer pallet 190 to precisely and accurately receive the first electrode layer 145. By precisely and accurately receiving the first electrode layer 145 (and subsequent second electrode layers 155 and first electrode layers 145), the transfer pallet 190 can enable precise and accurate stacking of electrode layers 145, 155 to form the electrode layer stack 199.

The method 400 can include receiving the second layer at ACT 435. For example, the method 400 can include receiving the second electrode layer 155 in the cavity 192 of the transfer pallet 190. For example, the method 400 can include receiving the second electrode layer 155 in the transfer pallet 190 with the second electrode layer 155 stacked on the first electrode layer 145 to form the electrode layer stack 199. The transfer pallet 190 can be positioned proximate the bottom 164 of the magnetic well 160 and can be positioned to receive the second electrode layer 155 after the second electrode layer 155 has passed through (e.g., in, within, into, inside, between at least a portion of sides 200, 205, 210, and 215 of) the cavity 185 of the magnetic well 160 and has exited the bottom 164 of the magnetic well 160. The second electrode layer 155 can be received within the cavity 192 of the transfer pallet 190, where the cavity 192 can be defined by the guide 194. The guide 194 can be precisely positioned to create a cavity 192 that has dimensions proximate to dimensions of the second electrode layer 155. The second electrode layer 155 can be placed in a precise location within cavity 192 of the transfer pallet 190 such that the position of the second electrode layer 155 can be known with a high degree of accuracy (e.g., ±98% accuracy). The second electrode layer 155 can be provided to the top 162 of the magnetic well 160 at ACT 425 and moves through the cavity 185 of the magnetic well 160 in the stacking direction 187. The second electrode layer 155 can move through least one magnetic field within the cavity 185 of the magnetic well 160, which can create an induced magnetic field that opposes the magnetic field within the cavity 185 of the magnetic well 160. The induced magnetic field that opposes the magnetic field within the cavity 185 can act on the second electrode layer 155 to control the movement of the second electrode layer 155 through the cavity 185. For example, the induced magnetic field can reduce a velocity of the second electrode layer 155 as the second electrode layer 155 moves through the magnetic well 160. The second electrode layer 155 can have a reduced velocity as the second electrode layer 155 exits the cavity 185. The reduced velocity of the second electrode layer 155 can enable the transfer pallet 190 to precisely and accurately receive the second electrode layer 155. By precisely and accurately receiving the second electrode layer 155 (and subsequent first electrode layers 145 and second electrode layers 155), the transfer pallet 190 can enable precise and accurate stacking of electrode layers 145, 155 to form the electrode layer stack 199.

Figure 5:
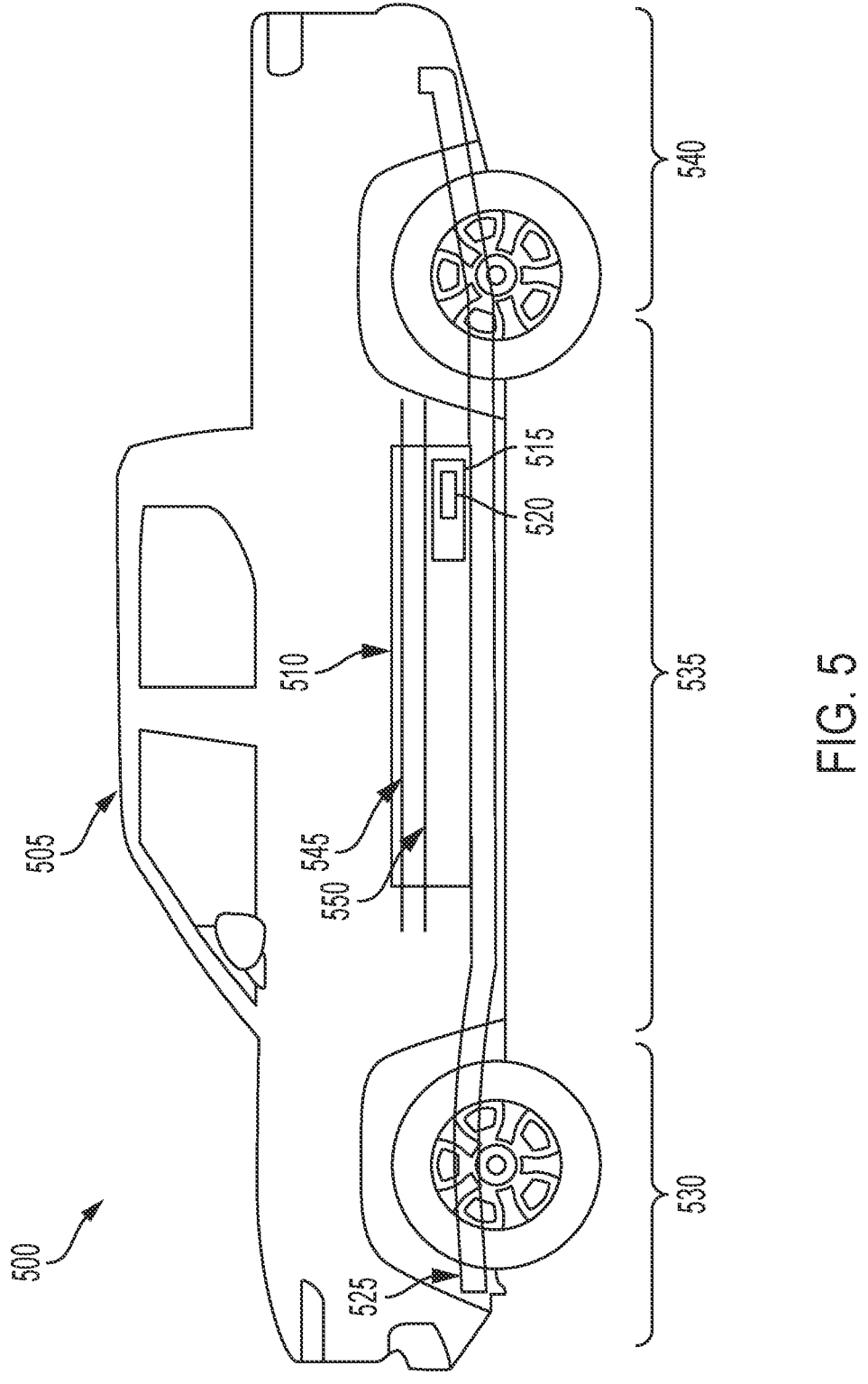
FIG. 5 depicts an example electric vehicle, in accordance with some aspects.

FIG. 5 depicts an example cross-sectional view 500 of an electric vehicle 505 installed with at least one battery pack 510. Electric vehicles 505 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 510 can also be used as an energy storage system to power a building, such as a residential home or commercial building. Electric vehicles 505 can be fully electric or partially electric (e.g., plug-in hybrid) and further, electric vehicles 505 can be fully autonomous, partially autonomous, or unmanned. Electric vehicles 505 can also be human operated or non-autonomous. Electric vehicles 505 such as electric trucks or automobiles can include on-board battery packs 510, battery modules 515, or battery cells 520 to power the electric vehicles. The battery cell 520 can be a battery cell 520 including an electrode layer stack 199 produced by the system 100 as shown in FIGS. 1-3, among others, or according to the method 400 or the method 1300 of FIGS. 4 and 13, respectively. The electric vehicle 505 can include a chassis 525 (e.g., a frame, internal frame, or support structure). The chassis 525 can support various components of the electric vehicle 505. The chassis 525 can span a front portion 530 (e.g., a hood or bonnet portion), a body portion 535, and a rear portion 540 (e.g., a trunk, payload, or boot portion) of the electric vehicle 505. The battery pack 510 can be installed or placed within the electric vehicle 505. For example, the battery pack 510 can be installed on the chassis 525 of the electric vehicle 505 within one or more of the front portion 530, the body portion 535, or the rear portion 540. The battery pack 510 can include or connect with at least one busbar, e.g., a current collector element. For example, the first busbar 545 and the second busbar 550 can include electrically conductive material to connect or otherwise electrically couple the battery modules 515 or the battery cells 520 with other electrical components of the electric vehicle 505 to provide electrical power to various systems or components of the electric vehicle 505.

Figure 6:
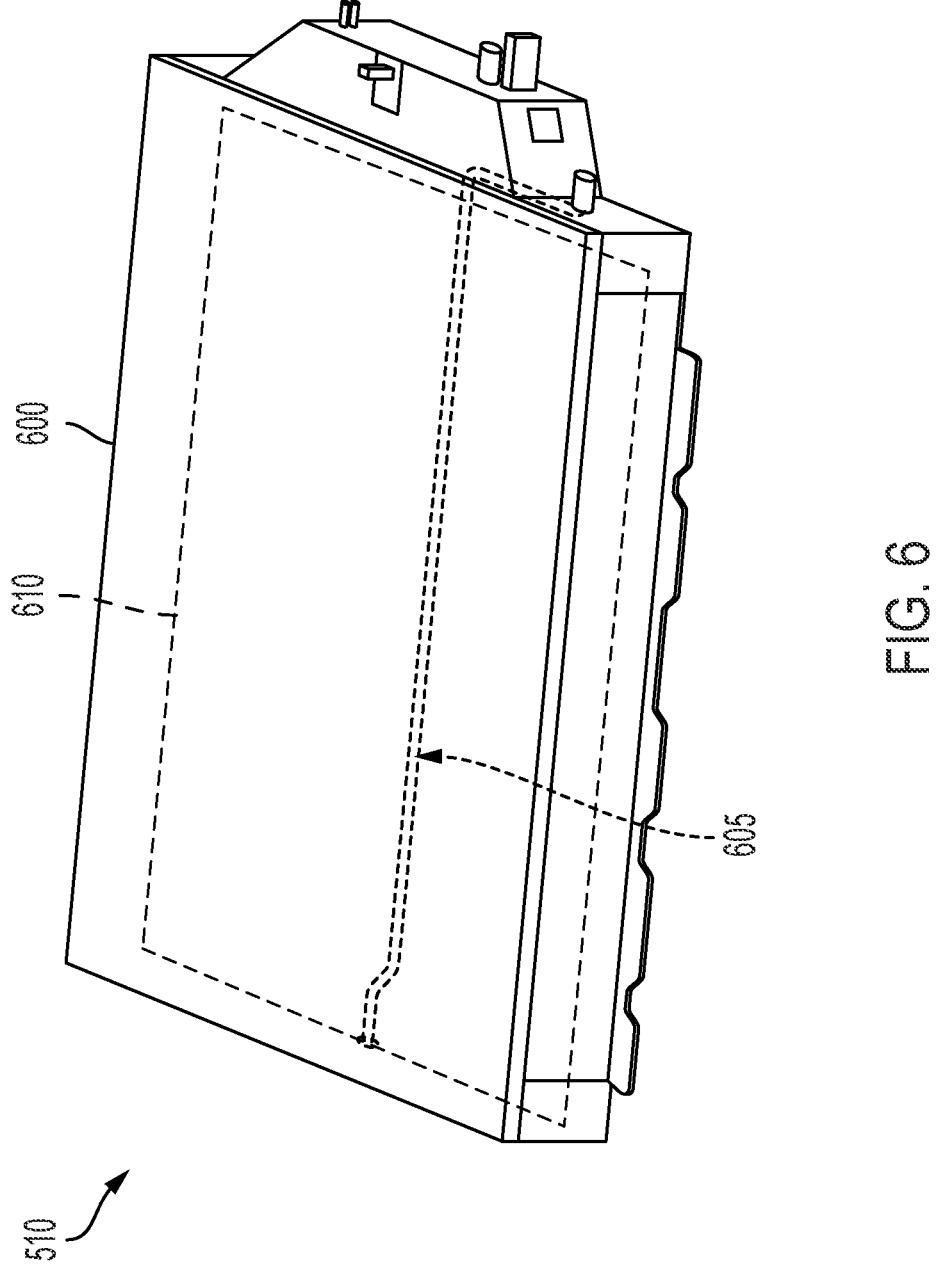
FIG. 6 depicts an example battery pack, in accordance with some aspects.

FIG. 6 depicts an example battery pack 510. Referring to FIG. 6, among others, the battery pack 510 can provide power to electric vehicle 505. Battery packs 510 can include any arrangement or network of electrical, electronic, mechanical or electromechanical devices to power a vehicle of any type, such as the electric vehicle 505. The battery pack 510 can include at least one housing 600. The housing 600 can include at least one battery module 515 or at least one battery cell 520, as well as other battery pack components. The housing 600 can include a shield on the bottom or underneath the battery module 515 to protect the battery module 515 from external conditions, for example if the electric vehicle 505 is driven over rough terrains (e.g., off-road, trenches, rocks, etc.) The battery pack 510 can include at least one cooling line 605 that can distribute fluid through the battery pack 510 as part of a thermal/temperature control or heat exchange system that can also include at least one thermal component (e.g., cold plate) 610. The thermal component 610 can be positioned in relation to a top submodule and a bottom submodule, such as in between the top and bottom submodules, among other possibilities. The battery pack 510 can include any number of thermal components 610. For example, there can be one or more thermal components 610 per battery pack 510, or per battery module 515. At least one cooling line 605 can be coupled with, part of, or independent from the thermal component 610.

Figure 7:
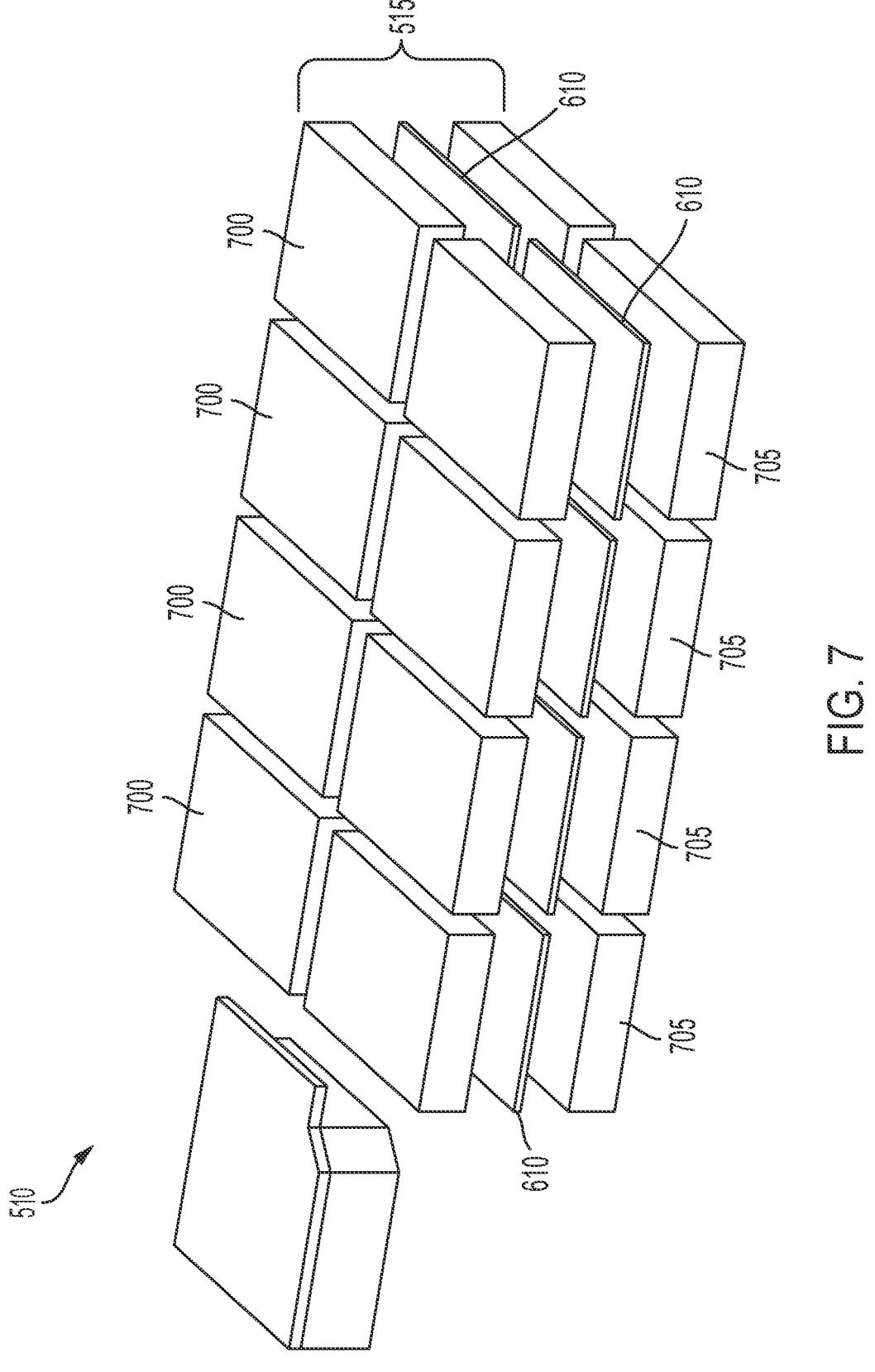
FIG. 7 depicts an example battery module, in accordance with some aspects.
Figure 8:
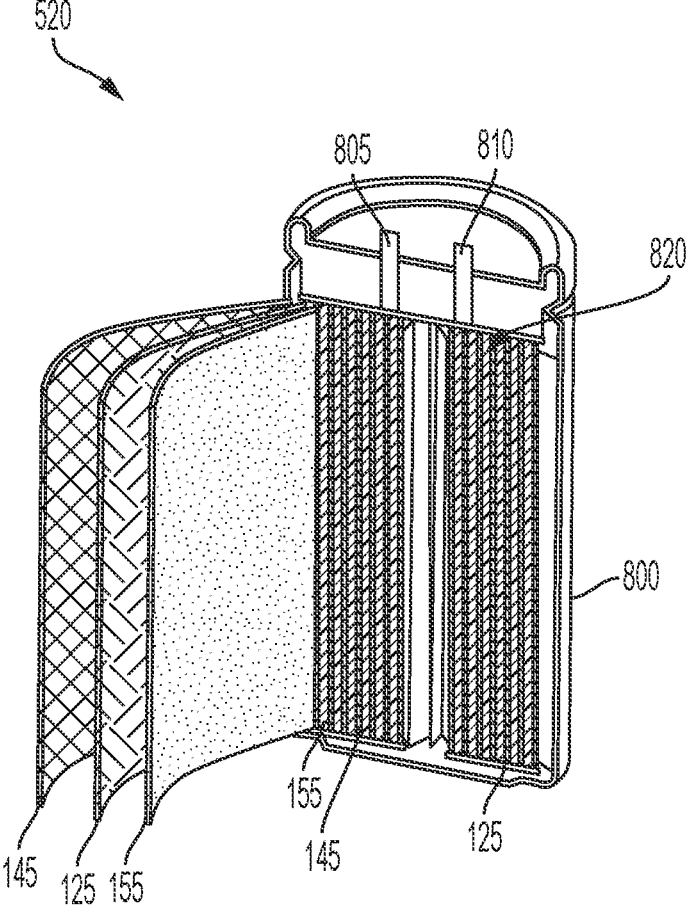
FIG. 8 depicts an example a cross sectional view of a battery cell, in accordance with some aspects.
Figure 9:
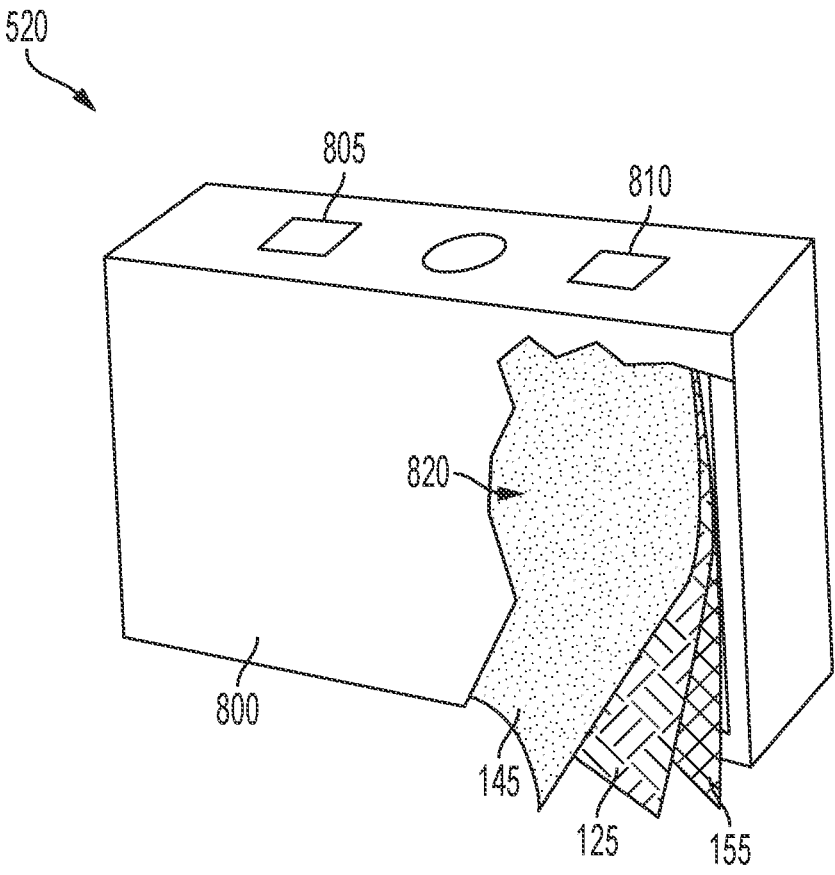
FIG. 9 depicts an example cross sectional view of a battery cell, in accordance with some aspects.
Figure 10:
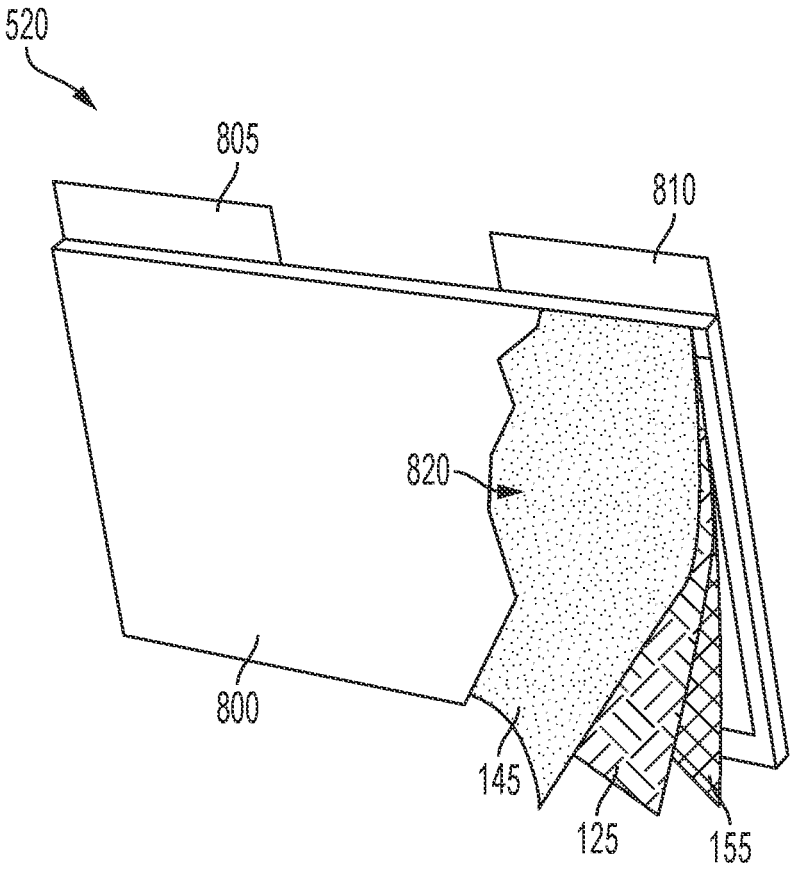
FIG. 10 depicts an example cross sectional view of a battery cell, in accordance with some aspects.

FIG. 7, among others, depicts example battery modules 515, and FIGS. 8-10, among others, depict example cross sectional views of a battery cell 520. The battery modules 515 can include at least one submodule. For example, the battery modules 515 can include at least one first (e.g., top) submodule 700 or at least one second (e.g., bottom) submodule 705. At least one thermal component 610 can be disposed between the top submodule 700 and the bottom submodule 705. For example, one thermal component 610 can be configured for heat exchange with one battery module 515. The thermal component 610 can be disposed or thermally coupled between the top submodule 700 and the bottom submodule 705. One thermal component 610 can also be thermally coupled with more than one battery module 515 (or more than two submodules 700, 705). The battery submodules 700, 705 can collectively form one battery module 515. In some examples each submodule 700, 705 can be considered as a complete battery module 515, rather than a submodule.

The battery modules 515 can each include a plurality of battery cells 520. The battery modules 515 can be disposed within the housing 600 of the battery pack 510. The battery modules 515 can include battery cells 520 that are cylindrical cells or prismatic cells, for example. The battery module 515 can operate as a modular unit of battery cells 520. For example, a battery module 515 can collect current or electrical power from the battery cells 520 that are included in the battery module 515 and can provide the current or electrical power as output from the battery pack 510. The battery pack 510 can include any number of battery modules 515. For example, the battery pack can have one, two, three, four, five, six, seven, eight, nine, ten, eleven, twelve or other number of battery modules 515 disposed in the housing 600. It should also be noted that each battery module 515 may include a top submodule 700 and a bottom submodule 705, possibly with a thermal component 610 in between the top submodule 700 and the bottom submodule 705. The battery pack 510 can include or define a plurality of areas for positioning of the battery module 515. The battery modules 515 can be square, rectangular, circular, triangular, symmetrical, or asymmetrical. In some examples, battery modules 515 may be different shapes, such that some battery modules 515 are rectangular but other battery modules 515 are square shaped, among other possibilities. The battery module 515 can include or define a plurality of slots, holders, or containers for a plurality of battery cells 520.

Battery cells 520 have a variety of form factors, shapes, or sizes. For example, battery cells 520 can have a cylindrical, rectangular, square, cubic, flat, pouch, or prismatic form factor. As depicted in FIG. 8, for example, the battery cell 520 can be cylindrical. As depicted in FIG. 9, for example, the battery cell 520 can be prismatic. As depicted in FIG. 10, for example, the battery cell 520 can include a pouch form factor. Battery cells 520 can be assembled, for example, by inserting a winded or stacked electrode roll (e.g., a jelly roll) including electrolyte material into at least one battery cell housing 800. For example, the battery cells 520 can include the electrode layer stack 199 of FIGS. 1 and 3, among others, and as produced by the system 100 or according to the method 400 of FIG. 4. The electrolyte material, e.g., an ionically conductive fluid or other material, can generate or provide electric power for the battery cell 520. The battery cell 520 can include an electrolyte layer where the electrolyte layer can be or include solid electrolyte material that can conduct ions. For example, the solid electrolyte layer can conduct ions without receiving a separate liquid electrolyte material. Battery cells 520 can be assembled, for example, by inserting a winded or stacked electrode roll (e.g., a jelly roll) including electrolyte material into at least one battery cell housing 800. The electrolyte material, e.g., an ionically conductive fluid or other material, can support electrochemical reactions of at the electrodes to generate, store, or provide electrical power for the battery cell by allowing for the conduction of ions between a positive and a negative electrode. The battery cell 120 can include an electrolyte layer where the electrolyte layer can be or include solid electrolyte material that can conduct ions. For example, the solid electrolyte layer can conduct ions without receiving a separate liquid electrolyte material. Battery cells 120 can be assembled, for example, by inserting a winded or stacked electrode roll (e.g., a jelly roll) including electrolyte material into at least one battery cell housing 800. The electrolyte material, e.g., an ionically conductive fluid or other material, can support conduction of ions between electrodes to generate or provide electric power for the battery cell 120. The housing 800 can be of various shapes, including cylindrical or rectangular, for example. Electrical connections can be made between the electrolyte material and components of the battery cell 520. For example, electrical connections to the electrodes with at least some of the electrolyte material can be formed at two points or areas of the battery cell 520, for example to form a first polarity terminal 805 (e.g., a positive or anode terminal) and a second polarity terminal 810 (e.g., a negative or cathode terminal). The polarity terminals can be made from electrically conductive materials to carry electrical current from the battery cell 520 to an electrical load, such as a component or system of the electric vehicle 505.

For example, the battery cell 520 can include at least one lithium-ion battery cell. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 520 to separate the anode and cathode from each other and to facilitate transfer of lithium ions between the anode and cathode. It should be noted that battery cell 520 can also take the form of a solid state battery cell developed using solid electrodes and solid electrolytes. Solid electrodes or electrolytes can be or include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula ABO3 (A=Li, Ca, Sr, La, and B=Al, Ti), garnet-type with formula $A_3B_2(XO_4)_3$ (A=Ca, Sr, Ba and X=Nb, Ta), lithium phosphorous oxynitride (LixPOyNz). In some embodiments, the solid electrolyte layer can include a glassy, ceramic and/or crystalline sulfide-based electrolyte (e.g., Li3PS4, Li7P3S11, Li2S—P2S5, Li2S—B2S3, SnS—$P_2S_5$, $Li_2S$—$SiS_2$, $Li_2S$—$P_2S_5$, $Li_2S$—$GeS_2$, $Li_{10}GeP_2Si_2$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

The battery cell 520 can be included in battery modules 515 or battery packs 510 to power components of the electric vehicle 505. The battery cell housing 800 can be disposed in the battery module 515, the battery pack 510, or a battery array installed in the electric vehicle 505. The housing 800 can be of any shape, such as cylindrical with a circular (e.g., as depicted in FIG. 8, among others), elliptical, or ovular base, among others. The shape of the housing 800 can also be prismatic with a polygonal base, as shown in FIG. 9, among others. As shown in FIG. 10, among others, the housing 800 can include a pouch form factor. The housing 800 can include other form factors, such as a triangle, a square, a rectangle, a pentagon, and a hexagon, among others. In some embodiments, the battery pack may not include modules. For example, the battery pack can have a cell-to-pack configuration wherein battery cells are arranged directly into a battery pack without assembly into a module.

The housing 800 of the battery cell 520 can include one or more materials with various electrical conductivity or thermal conductivity, or a combination thereof. The electrically conductive and thermally conductive material for the housing 800 of the battery cell 520 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 800 of the battery cell 520 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others. In examples where the housing 800 of the battery cell 520 is prismatic (e.g., as depicted in FIG. 9, among others) or cylindrical (e.g., as depicted in FIG. 8, among others), the housing 800 can include a rigid or semi-rigid material such that the housing 800 is rigid or semi-rigid (e.g., not easily deformed or manipulated into another shape or form factor). In examples where the housing 800 includes a pouch form factor, (e.g., as depicted in FIG. 10, among others), the housing 800 can include a flexible, malleable, or non-rigid material such that the housing 800 can be bent, deformed, manipulated into another form factor or shape.

The battery cell 520 can include at least one anode layer, such as the second electrode layer 155, which can be disposed within the cavity 820 defined by the housing 800. The second electrode layer 155 can include a first redox potential. The second electrode layer 155 can receive electrical current into the battery cell 520 and output electrons during the operation of the battery cell 520 (e.g., charging or discharging of the battery cell 520). The second electrode layer 155 can include an active substance. The active substance can include, for example, an activated carbon or a material infused with conductive materials (e.g., artificial or natural Graphite, or blended), lithium titanate ($Li_4Ti_5O_{12}$), or a silicon-based material (e.g., silicon metal, oxide, carbide, pre-lithiated). The active substance can include graphitic carbon (e.g., ordered or disordered carbon with sp$^2$ hybridization), Li metal anode, or a silicon-based carbon composite anode, or other lithium alloy anodes (Li—Mg, Li—Al, Li—Ag alloy etc.) or composite anodes consisting of lithium and carbon, silicon and carbon or other compounds. In some examples, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell does not comprise an anode active material in an uncharged state.

The battery cell 520 can include at least one cathode layer, such as the first electrode layer 145 (e.g., a composite cathode layer compound cathode layer, a compound cathode, a composite cathode, or a cathode). The first electrode layer 145 can include a second redox potential that can be different than the first redox potential of the second electrode layer 155. The first electrode layer 145 can be disposed within the cavity 820. The first electrode layer 145 can output electrical current out from the battery cell 520 and can receive electrons during the discharging of the battery cell 520. The first electrode layer 145 can also release lithium ions during the discharging of the battery cell 520. Conversely, the first electrode layer 145 can receive electrical current into the battery cell 520 and can output electrons during the charging of the battery cell 520. The first electrode layer 145 can receive lithium ions during the charging of the battery cell 520.

The battery cell 520 can include an electrolyte layer, such as the solid state electrolyte or separator material 125. The electrolyte or separator material 125 can be laminated to the cathode electrode material 120 to form the first electrode layer 145, for example. The electrolyte or separator material 125 can be separate from the first electrode layer 145. For example, the electrolyte or separator material 125 can be a separate layer that is stacked within the cavity of the transfer pallet 190 after moving through (e.g., in, within, into, inside, between at least a portion of sides 200, 205, 210, and 215 of) the cavity 185 of the magnetic well 160. The electrolyte or separator material can be disposed within the cavity 820. The electrolyte or separator material 125 can be arranged between the second electrode layer 155 and the first electrode layer 145 to separate the second electrode layer 155 and the first electrode layer 145. The electrolyte or separator material 125 can transfer ions between the second electrode layer 155 and the first electrode layer 145. For example, the electrolyte or separator material 125 can be a liquid electrolyte to transfer ions between the second electrode layer 155 and the first electrode layer 145. The electrolyte or separator material 125 can transfer cations from the second electrode layer 155 to the first electrode layer 145 during the operation of the battery cell 520. The electrolyte or separator material 125 can transfer anions (e.g., lithium ions) from the first electrode layer 145 to the second electrode layer 155 during the operation of the battery cell 520.

The redox potential of layers (e.g., the first redox potential of the second electrode layer 155 or the second redox potential of the first electrode layer 145) can vary based on a chemistry of the respective layer or a chemistry of the battery cell 520. For example, lithium-ion batteries can include an LFP (lithium iron phosphate) chemistry, an NMC (Nickel Manganese Cobalt) chemistry, an NCA (Nickel Cobalt Aluminum) chemistry, or an LCO (lithium cobalt oxide) chemistry for a cathode layer (e.g., the first electrode layer 145). Lithium-ion batteries can include a graphite chemistry, a silicon-graphite chemistry, or a lithium metal chemistry for the anode layer (e.g., the second electrode layer 155).

For example, lithium-ion batteries can include an olivine phosphate ($LiMPO_4$, M=Fe and/or Co and/or Mn and/or Ni)) chemistry, LISICON or NASICON Phosphates ($Li_3M_2$ $(PO_4)_3$ and $LiMPO_4O_x$, M=Ti, V, Mn, Cr, and Zr), for example Lithium iron phosphate (LFP), Lithium iron manganese phosphate (LMFP), a layered oxides ($LiMO_2$, M=Ni and/or Co and/or Mn and/or Fe and/or Al and/or Mg) examples NMC (Nickel Manganese Cobalt) chemistry, an NCA (Nickel Cobalt Aluminum) chemistry, or an LCO (lithium cobalt oxide) chemistry for a cathode layer, Lithium rich layer oxides ($Li_{1+x}M_{1-x}O_2$) (Ni, and/or Mn, and/or Co), (OLO or LMR), spinel ($LiMn_2O_4$) and high voltage spinels ($LiMn_{1.5}Ni_{0.5}O_4$), disordered rock salt, Fluorophosphates $Li_2FePO_4F$ (M=Fe, Co, Ni) and Fluorosulfates $LiMSO_4F$ (M=Co, Ni, Mn) (e.g., the cathode layer 255). Lithium-ion batteries can include a graphite chemistry, a silicon-graphite chemistry, or a lithium metal chemistry for the anode layer (e.g., the anode layer 245). For example, a cathode layer having an LFP chemistry can have a redox potential of 3.4 V vs. Li/Li+, while an anode layer having a graphite chemistry can have a 0.2 V vs. Li/Li+ redox potential.

Electrode layers can include anode active material or cathode active material, commonly in addition to a conductive carbon material, a binder, or other additives as a coating on a current collector (metal foil). The chemical composition of the electrode layers can affect the redox potential of the electrode layers. For example, cathode layers (e.g., the first electrode layer 145) can include medium to high-nickel content (50 to 80%, or equal to 80% Ni) lithium transition metal oxide, such as a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and Lithium iron manganese phosphate ("LMFP"). Anode layers (e.g., the second electrode layer 155) can include conductive carbon materials such as graphite, carbon black, carbon nanotubes, and the like. Anode layers can include Super P carbon black material, Ketjen Black, Acetylene Black, SWCNT, MWCNT, graphite, carbon nanofiber, or graphene, for example.

Electrode layers (e.g., the first electrode layer 145 or the second electrode layer 155) can also include chemical binding materials (e.g., binders). Binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Binder materials can include agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly(vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof.

Current collector materials (e.g., a current collector foil to which an electrode active material is laminated to form a cathode layer or an anode layer) can include a metal material. For example, current collector materials can include aluminum, copper, nickel, titanium, stainless steel, or carbonaceous materials. The current collector material can be formed as a metal foil. For example, the current collector material can be an aluminum (Al) or copper (Cu) foil. The current collector material can be a metal alloy, made of Al, Cu, Ni, Fe, Ti, or combination thereof. The current collector material can be a metal foil coated with a carbon material, such as carbon-coated aluminum foil, carbon-coated copper foil, or other carbon-coated foil material.

The electrolyte or separator material 125 can include or be made of a liquid electrolyte material. For example, the electrolyte or separator material 125 can be or include at least one layer of polymeric material (e.g., polypropylene, polyethylene, or other material) that is wetted (e.g., is saturated with, is soaked with, receives) a liquid electrolyte substance. The liquid electrolyte material can include a lithium salt dissolved in a solvent. The lithium salt for the liquid electrolyte material for the electrolyte or separator material 125 can include, for example, lithium tetrafluoroborate ($LiBF_4$), lithium hexafluorophosphate ($LiPF_6$), and lithium perchlorate ($LiClO_4$), among others. The solvent can include, for example, dimethyl carbonate (DMC), ethylene carbonate (EC), and diethyl carbonate (DEC), among others. The electrolyte or separator material 125 can include or be made of a solid electrolyte material, such as a ceramic electrolyte material, polymer electrolyte material, or a glassy electrolyte material, or among others, or any combination thereof.

In some embodiments, the solid electrolyte film can include at least one layer of a solid electrolyte. Solid electrolyte materials of the solid electrolyte layer can include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride (LixPOyNz). In some embodiments, the solid electrolyte layer can include a glassy, ceramic and/or crystalline sulfide-based electrolyte (e.g., $Li_3PS_4$, $Li_7P_3S_{11}$, $Li_2S—P_2S_5$, $Li_2S—B_2S_3$, SnS—$P_2S_5$, $Li_2S—SiS_2$, $Li_2S—P_2S_5$, $Li_2S—GeS_2$, $Li_{10}GeP_2Si_2$) and/or sulfide-based lithium argyrodites with formula $Li_6PS_5X$ (X=Cl, Br) like $Li_6PS_5Cl$. Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

In examples where the electrolyte or separator material 125 includes a liquid electrolyte material, the electrolyte or separator material 125 can include a non-aqueous polar solvent. The non-aqueous polar solvent can include a carbonate such as ethylene carbonate, propylene carbonate, diethyl carbonate, ethyl methyl carbonate, dimethyl carbonate, or a mixture of any two or more thereof. The electrolyte or separator material 125 can include at least one additive.

The additives can be or include vinylidene carbonate, fluoroethylene carbonate, ethyl propionate, methyl propionate, methyl acetate, ethyl acetate, or a mixture of any two or more thereof. The electrolyte or separator material 125 can include a lithium salt material. For example, the lithium salt can be lithium perchlorate, lithium hexafluorophosphate, lithium bis(fluorosulfonyl)imide, lithium bis(trifluorosulfonyl)imide, or a mixture of any two or more thereof. The lithium salt may be present in the electrolyte or separator material 125 from greater than 0 M to about 1.5 M.

Figure 11:
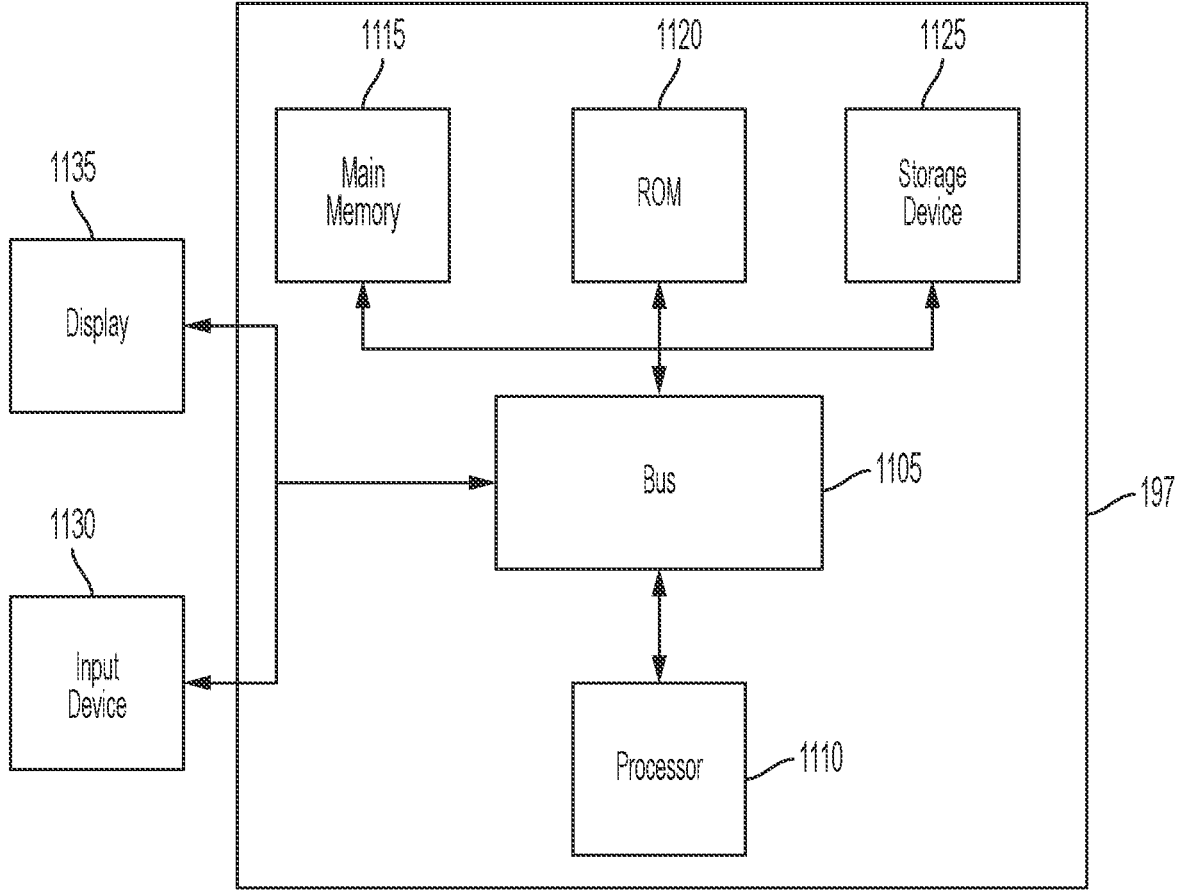
FIG. 11 is a block diagram illustrating an architecture for a computer system that can be employed to implement elements of the systems and methods described and illustrated herein.

FIG. 11 depicts an example block diagram of an example computing system 197. The computer system or computing system 197 can include or be used to implement a data processing system or its components. For example, the computing system 197 can be used to control a component of the system 100. The computing system 197 can be used to control the magnetic well 160 or the magnets 167, 172, 177, 182 associated with the magnetic well 160 to control a magnetic field within the cavity 185 of the magnetic well 160. For example, the magnets 167, 172, 177, 182 can be electromagnets that generate a magnetic field in proportion to a current applied to the electromagnets 167, 172, 177, 182. The computing system 197 can cause a current provided to one or more of the magnets 167, 172, 177, 182 to increase, decrease, remain constant, fluctuate over time, or change in some other way in order to affect the magnetic field within the cavity 185 of the magnetic well 160. A change in a magnetic field within the cavity 185 of the magnetic well 160 can control the movement of an electrode layer 145, 155 within the cavity of the magnetic well 160. For example, by increasing a current provided to at least one of the magnets 167, 172, 177, 182, the computing system 197 can cause an electrode layer 145, 155 moving through the magnetic well 160 to decrease (e.g., to decelerate the electrode layer 145, 155). The computing system 197 can cause a current provided to at least one of the magnets 167, 172, 177, 182 to decrease. For example, a decreased current provided to the magnets 167, 172, 177, 182 can cause a proportional reduction in a strength of a magnetic field within the cavity 185, which can cause a velocity of electrode layer 145, 155 to increase (e.g., accelerate) as the electrode layer 145, 155 moves through the magnetic well 160.

The computing system 197 includes at least one bus 1105 or other communication component for communicating information and at least one processor 1110 or processing circuit coupled to the bus 1105 for processing information. The computing system 197 can also include one or more processors 1110 or processing circuits coupled to the bus for processing information. The computing system 197 also includes at least one main memory 1115, such as a random access memory (RAM) or other dynamic storage device, coupled to the bus 1105 for storing information, and instructions to be executed by the processor 1110. The main memory 1115 can be used for storing information during execution of instructions by the processor 1110. The computing system 197 may further include at least one read only memory (ROM) 1120 or other static storage device coupled to the bus 1105 for storing static information and instructions for the processor 1110. A storage device 1125, such as a solid state device, magnetic disk or optical disk, can be coupled to the bus 1105 to persistently store information and instructions.

The computing system 197 may be coupled via the bus 1105 to a display 1135, such as a liquid crystal display, or active matrix display, for displaying information to a user. An input device 1130, such as a keyboard or voice interface may be coupled to the bus 1105 for communicating information and commands to the processor 1110. The input device 1130 can include a touch screen display 1135. The input device 1130 can also include a cursor control, such as a mouse, a trackball, or cursor direction keys, for communicating direction information and command selections to the processor 1110 and for controlling cursor movement on the display 1135.

The processes, systems and methods described herein can be implemented by the computing system 197 in response to the processor 1110 executing an arrangement of instructions contained in main memory 1115. Such instructions can be read into main memory 1115 from another computer-readable medium, such as the storage device 1125. Execution of the arrangement of instructions contained in main memory 1115 causes the computing system 197 to perform the illustrative processes described herein. One or more processors in a multi-processing arrangement may also be employed to execute the instructions contained in main memory 1115. Hard-wired circuitry can be used in place of or in combination with software instructions together with the systems and methods described herein. Systems and methods described herein are not limited to any specific combination of hardware circuitry and software.

Although an example computing system has been described in FIG. 11, the subject matter including the operations described in this specification can be implemented in other types of digital electronic circuitry, or in computer software, firmware, or hardware, including the structures disclosed in this specification and their structural equivalents, or in combinations of one or more of them.

Figure 12:
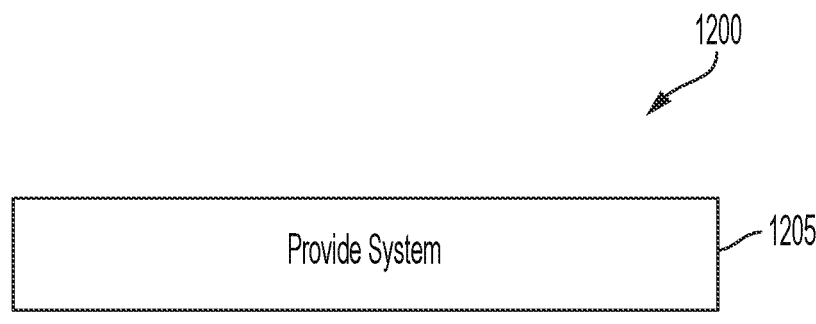
FIG. 12 is a flow diagram of an example method, in accordance with some aspects.

FIG. 12, among others, depicts a method 1200 for providing a system. For example, the method 1200 can include providing a system for stacking electrode layers at ACT 1205. The system for stacking electrode layers can be the system 100 as depicted in FIGS. 1-3. The system for stacking electrode layers can include a magnetic well 160 defining a cavity 185. At least one electrode layer (e.g., multiple first electrode layers 145 and second electrode layers 155) can move through (e.g., in, within, into, inside, between at least a portion of sides 200, 205, 210, and 215 of) the cavity 185 of the magnetic well 160 in a stacking direction 187. As the electrode layers 145, 155 move through the cavity 185 in the stacking direction, the electrode layers 145, 155 can move through at least one magnetic field produced by a magnet associated with the magnetic well 160. The movement of the electrode layers 145, 155 through the magnetic field within the cavity 185 of the magnetic well 160 can induce a current within the electrode layer 145, 155. The induced current within the electrode layer 145, 155 can create an induced magnetic field that acts in a direction to oppose the magnetic field within the cavity 185 of the magnetic well 160. The induced magnetic field can act to reduce a velocity of the electrode layer 145, 155 moving through the cavity 185. Accordingly, the magnetic field within the cavity of the magnetic well 160 can control (e.g., affect, reduce, decrease, increase, or otherwise influence) the movement of the electrode layer 145, 155 through the cavity 185. The system for stacking electrode layers can include a transfer pallet 190 to receive the electrode layers 145, 155 as the exit a bottom 164 of the magnetic well 160. The electrode layers 145, 155 can be stacked within a cavity 192 of the transfer pallet 190. By controlling the movement of the electrode layer 145, 155 within the magnetic well to, for example, slow a velocity of the electrode layers 145, 155, the system for stacking electrode layers can precisely stack multiple electrode layers 145, 155 in the transfer pallet 190 to create an electrode layer stack 199.

Figure 13:
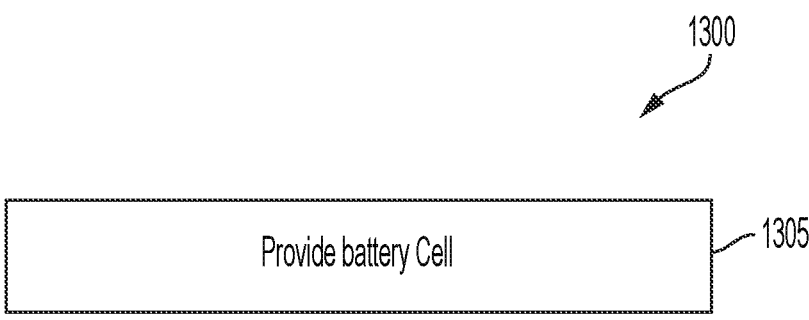
FIG. 13 is a flow diagram of an example method, in accordance with some aspects.

FIG. 13, among others, depicts a method 1300 for providing a battery cell. For example, the method 1300 can include providing a battery cell 520 including an electrode layers stack 199 at ACT 1305. The electrode layer stack 199 of the battery cell 520 can be created by providing the first electrode layer 145 to the cavity 185 of the magnetic well 160. The first electrode layer 145 can move through (e.g., in, within, into, inside, between at least a portion of sides 200, 205, 210, and 215 of) the cavity 185 of the magnetic well 160 in the stacking direction 187. The magnetic well 160 can generate a magnetic field to control the movement of the first electrode layer 145 through the cavity 185 of the magnetic well 160. For example, the magnetic field can induce a current within the first electrode layer 145. The induced current within the first electrode layer 145 can create an induced magnetic field that acts in a direction to oppose the magnetic field within the cavity 185 of the magnetic well 160. The induced magnetic field can act to reduce a velocity of the first electrode layer 145 moving through the cavity 185. The electrode layer stack 199 of the battery cell 520 can be created by providing the second electrode layer 155 to the cavity 185 of the magnetic well 160. The second electrode layer 155 can move through the cavity 185 of the magnetic well 160 in the stacking direction 187. The magnetic well 160 can generate the magnetic field to control the movement of the second electrode layer 155 through the cavity 185 of the magnetic well 160. For example, the magnetic field can induce a current within the second electrode layer 155. The induced current within the second electrode layer 155 can create an induced magnetic field that acts in a direction to oppose the magnetic field within the cavity 185 of the magnetic well 160. The induced magnetic field can act to reduce a velocity of the second electrode layer 155 moving through the cavity 185.

The electrode layer stack 199 of the battery cell 520 can be created by receiving the first electrode layer 145 in the transfer pallet 190. For example, as the first electrode layer 145 exits the cavity 185 of the magnetic well 160, the first electrode layer 145 can be received within the cavity 192 of the transfer pallet 190. The electrode layer stack 199 of the battery cell 520 can be created by receiving the second electrode layer 155 in the transfer pallet 190. For example, as the second electrode layer 155 exits the cavity 185 of the magnetic well 160, the second electrode layer 155 can be received within the cavity 192 of the transfer pallet 190. The second electrode layer 155 can be stacked on the first electrode layer 145. For example, the second electrode layer 155 can be provided to the cavity 185 of the magnetic well 160 after the first electrode layer 145 is provided to the cavity 185 of the magnetic well 160 such that the second electrode layer 155 exits the magnetic well 160 after the first electrode layer 145. The second electrode layer 155 can be received within the cavity 192 of the transfer pallet 190 after the first electrode layer 145.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system to stack electrode layers of a battery, comprising:
   a magnetic well defining a cavity, the cavity configured to allow a movement of a first singulated sheet of a cathode electrode layer alternated with a second singulated sheet of an anode electrode layer through the cavity; and
   a first magnet to generate a first magnetic field within the magnetic well, wherein the magnetic field interacts with the cathode electrode layer and the anode electrode layer to control the movement of the first singulated sheet and the second singulated sheet through the cavity.

2. The system of claim 1, comprising:
   the first magnet associated with a first section of the magnetic well positioned proximate a top of the magnetic well; and
   a second magnet associated with a second section of the magnetic well positioned proximate a bottom of the magnetic well, the second magnet to generate a second magnetic field;
   wherein the second magnetic field is different than the first magnetic field.

3. The system of claim 1, comprising:
   a second magnet to generate a second magnetic field, wherein the second magnetic field is stronger than the first magnetic field.

4. The system of claim 1, comprising:
   the first magnet associated with a first section of the magnetic well positioned proximate a top of the magnetic well; and
   a second magnet associated with a second section of the magnetic well positioned proximate a bottom of the magnetic well, the second magnet to generate a second magnetic field;

wherein the battery is a solid-state battery; and a first velocity of the cathode electrode layer or the anode electrode layer in the first section is greater than a second velocity of the cathode electrode layer or the anode electrode layer in the second section.

5. The system of claim 1, comprising:

the first magnet associated with a first section of the magnetic well positioned proximate a top of the magnetic well; and a second magnet associated with a second section of the magnetic well positioned proximate a bottom of the magnetic well, the second magnet to generate a second magnetic field;

wherein a first velocity of the cathode electrode layer or the anode electrode layer in the first section is less than a second velocity of the cathode electrode layer or the anode electrode layer in the second section.

6. The system of claim 1, comprising:

the first magnet associated with a first section of the magnetic well positioned proximate a top of the magnetic well;

a second magnet associated with a second section of the magnetic well positioned proximate a bottom of the magnetic well, the second magnet to generate a second magnetic field;

a third magnet associated with a third section of the magnetic well positioned between the first section and the second section, the third magnet to generate a third magnetic field;

wherein a distance between the cathode electrode layer and the anode electrode layer is greater with the cathode electrode layer and the anode electrode layer in the first section than with the cathode electrode layer and the anode electrode layer in the third section; and wherein a distance between the cathode electrode layer and the anode electrode layer is greater with the cathode electrode layer and the anode electrode layer in the third section than with the cathode electrode layer and the anode electrode layer in the second section.

7. The system of claim 1, wherein the first magnetic field induces a current in the anode electrode layer as the anode electrode layer moves through the cavity, wherein the current creates a second magnetic field that opposes the first magnetic field.

8. The system of claim 1, wherein the first magnet is an electromagnet and the first magnetic field is dynamic based upon a current applied to the first magnet, the system comprising:

a computing system operatively coupled with the first magnet and configured to provide an adjustable current to the first magnet.

9. The system of claim 1, comprising:

the magnetic well including a top and a bottom, wherein the anode electrode layer moves within the cavity from the top to the bottom; and a transfer pallet positioned proximate the bottom of the magnetic well, the transfer pallet to receive the anode electrode layer after the anode electrode layer passes through the cavity.

10. The system of claim 1, comprising:

a first conveyor device to provide the anode electrode layer to the magnetic well, the first conveyor device including a conveyor surface and at least one roller.

11. The system of claim 1, comprising:

a first conveyor device to provide the anode electrode layer to the magnetic well, the first conveyor device including a conveyor surface and at least one roller, wherein the conveyor surface moves in a first direction; and a second conveyor device to provide a second electrode layer to the magnetic well, the second conveyor device including a second conveyor surface and at least one second roller, wherein the second conveyor surface moves in a second direction.

12. The system of claim 1, comprising:

a first cutting device to singulate the cathode electrode layer from a sheet of first electrode material;

a first conveyor device to receive the singulated cathode electrode layer from the first cutting device and to provide the singulated cathode electrode layer to the magnetic well, the first conveyor device including a conveyor surface and at least one roller, wherein the conveyor surface moves in a first direction;

a second cutting device to singulate an anode electrode layer from a sheet of an anode electrode material; and a second conveyor device to receive the singulated anode electrode layer from the second cutting device and to provide the singulated anode electrode layer to the magnetic well, the second conveyor device including a second conveyor surface and at least one second roller, wherein the second conveyor surface moves in a second direction.

13. The system of claim 1, comprising:

a laminating device including at least one laminating roller, the laminating device to laminate a sheet of first electrode material with a separator material to form a laminated electrode sheet;

a first cutting device to singulate the cathode electrode layer from the laminated electrode sheet; and a first conveyor device to provide the cathode electrode layer to the magnetic well, the first conveyor device including a conveyor surface and at least one roller.

14. The system of claim 1, comprising:

a laminating device including at least one laminating roller, the laminating device to laminate a sheet of cathode electrode material with a separator material to form a laminated cathode electrode sheet;

a first cutting device to singulate the cathode electrode layer from the laminated electrode sheet;

a first conveyor device to receive the singulated cathode electrode layer from the first cutting device and to provide the singulated cathode electrode layer to the magnetic well, the first conveyor device including a conveyor surface and at least one roller, wherein the conveyor surface moves in a first direction;

a second cutting device to singulate an anode electrode layer from a sheet of anode electrode material; and a second conveyor device to receive the singulated anode electrode layer from the second cutting device and to provide the singulated anode electrode layer to the magnetic well, the second conveyor device including a second conveyor surface and at least one second roller, wherein the second conveyor surface moves in a second direction.

15. The system of claim 1, further comprising:

a controller to adjust a magnitude of the first magnetic field to control the movement of the cathode electrode layer and the anode electrode layer, wherein the cathode electrode layer and the anode electrode layer differ in magnetic susceptibility.

16. The system of claim 1, further comprising:

a controller to adjust a magnitude of the first magnetic field to maintain a spacing between the cathode electrode layer and the anode electrode layer.

\* \* \* \* \*